(12) United States Patent
Faulhaber et al.

(10) Patent No.: US 6,200,031 B1
(45) Date of Patent: Mar. 13, 2001

(54) LINEAR GUIDE ARRANGEMENT

(75) Inventors: Thomas Faulhaber, Bergrheinfeld; Ernst Albert, Sand am Main; Viktor Pfeuffer, Bergrheinfeld, all of (DE)

(73) Assignee: Deutsche Star GmbH, Schweinfurt (DE)

( * ) Notice: Subject to any disclaimer, the term of this patent is extended or adjusted under 35 U.S.C. 154(b) by 0 days.

(21) Appl. No.: 08/729,771

(22) Filed: Oct. 8, 1996

(30) Foreign Application Priority Data

Oct. 17, 1995 (DE) ................................................ 195 38 665
Jul. 31, 1996 (DE) ........................................ 296 13 277 U

(51) Int. Cl.[7] ...................................................... F16C 29/06
(52) U.S. Cl. ............................................................ 384/45
(58) Field of Search ................................ 384/43, 44, 45; 464/168

(56) References Cited

U.S. PATENT DOCUMENTS

| 4,040,679 | 8/1977 | Teramachi . |
| 4,390,215 | 6/1983 | Mottate . |
| 4,420,194 | 12/1983 | Asami . |
| 4,441,765 | 4/1984 | Kasai et al. . |
| 4,472,003 | 9/1984 | Osawa . |
| 4,505,522 | 3/1985 | Tanaka . |
| 4,616,886 | 10/1986 | Teramachi . |
| 4,637,739 | 1/1987 | Hattori . |
| 4,674,893 | 6/1987 | Teramachi . |
| 4,983,049 | 1/1991 | Lacomte . |
| 5,358,336 | 10/1994 | Agari . |
| 5,429,439 | 7/1995 | Hsu et al. . |
| 5,433,527 | 7/1995 | Shimo et al. . |
| 5,435,649 | 7/1995 | Kuwahara . |

FOREIGN PATENT DOCUMENTS

| 2027338 | 12/1971 | (DE) . |
| 3805392 | 8/1989 | (DE) . |
| 4412797 | 10/1995 | (DE) . |
| 9502498 | 8/1996 | (DE) . |
| 0318980 | 6/1989 | (EP) . |
| 0474948 | 3/1992 | (EP) . |
| 0494682 | 7/1992 | (EP) . |
| 0608832 | 8/1994 | (EP) . |
| 0676553 | 10/1995 | (EP) . |
| 61-133122 | 8/1986 | (JP) . |
| 5172139 | 7/1993 | (JP) . |
| 6147222 | 5/1994 | (JP) . |

OTHER PUBLICATIONS

INA Lineartechnik oHG Leaflet T452D–03/1992, Seite 1–3. (No date).
Franke & Heydrich KG Leaflet, Franke–Linearführungen mit neuem Kugelumlaufelement KU (DBPa), cover sheet and 1 page. (No date).
Leaflet, Einfache und Doppel–Kugelführungen für begrenzte Schiebewege mit Lagerböcken, issued 1974, cover and p. 10. (No date).
Nippon Thompson Co., Ltd. Leaflet, Linear Way Serie L (Miniaturausführung) LWL•LWLF, CAT–6710. (No date).
THK Co., Ltd., Katalog Nr. 54G, LM Guide RSR Miniatur–Kugelführungen (4 pages). (no date).
THK Co., Ltd. Katalog Nr. 100–1 AG, "THK LM System Linearführungen" (Cover page & p. 112). (No. date).

*Primary Examiner*—Lenard A. Footland
(74) *Attorney, Agent, or Firm*—Baker Botts L.L.P.

(57) ABSTRACT

The present invention relates to a linear guide arrangement comprising a guide rail with at least one axis and at least one guide carriage movable on the guide rail in the direction of the axis. The guide carriage runs on the guide rail with intermediacy of an endless rolling-element circuit. To this end, the guide carriage is designed with a guide carriage housing and with a carriage member made separately from the guide carriage housing and accommodated within the guide carriage housing. The guide carriage housing comprises at least one side panel adjacent to the rolling-element circuit and substantially parallel to the axial direction, as well as at least one end plate adjacent to the rolling-element circuit and substantially orthogonal to the axial direction. The bearing row of rolling elements runs on the carriage member.

70 Claims, 11 Drawing Sheets

LINEAR GUIDE ARRANGEMENT

CROSS REFERENCE TO RELATED APPLICATIONS

Not applicable

FEDERALLY SPONSORED RESEARCH OR DEVELOPMENT

Not applicable

BACKGROUND OF THE INVENTION

The invention relates to a linear guide arrangement comprising a guide rail having an axis and at least one guide carriage, movable on this guide rail in the direction of the axis, which runs on the guide rail with intermediacy of at least one endless rolling-element circuit, this rolling-element circuit consisting of a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage, where the guide carriage is designed with a guide carriage housing and with a carriage member made separately from the guide carriage housing and accommodated within the guide carriage housing, where in addition, the guide carriage housing comprises at least one side panel adjacent to the rolling-element circuit and substantially parallel to the axial direction and additionally comprises at least one end plate adjacent to one of the curved rows of rolling elements and substantially orthogonal to the axial direction, while in addition, the bearing row of rolling elements runs on the carriage member.

In a linear guide arrangement disclosed in EP-0,474,948, a carriage member is surrounded by a guide carriage housing. The guide carriage housing has the shape of a rectangular frame with side panels that run parallel to the axis of the guide rail and with end plates lying orthogonal to the axis of the guide rail. Radially outer curved guide surfaces of the curved rolling-element guides and rolling-element guide surfaces of the rolling-element return guides connecting to the latter are formed in the side panels. On the carriage member are formed guide strips, which, upon insertion of the carriage member into the guide carriage housing, extend into the region of the radially outer curved guide surfaces and the return guide surfaces of the side panels and thus supplement the curved rolling-element guides and the rolling-element return guides.

In this embodiment, the guide strips of the carriage member, as a rule made of steel, are necessarily shorter in the direction of the axis of the guide rail than the distance between the faces of the carriage member resting on the end plates. This means that costly machining of the carriage member is necessary in order to adjust it to the guide carriage housing so that it can be inserted into the housing in the correct position. Thus, it is not possible merely to obtain the carriage member of drawn material simply by cutting off a length of material; nor is it sufficient to regrind cut-off pieces of the length of material producing the carriage member by simple grinding processes for the purpose of increasing accuracy. Rather, milling processes are required in order to work the ribs out of a cut-off piece of a length of material. According to a first embodiment of EP-0,474,948 A1 (see FIG. 2 therein), radially inner guide faces of the curved rolling-element guides are formed at the ends of the ribs. This means that particularly costly machining of the ribs is required in order to obtain the radially inner guide faces of the curved rolling-element guides on them. According to a modified embodiment (see FIG. 5 of EP-0,474,948 A1), the radially inner curved guide surfaces of the curved rolling-element guides are formed on reversing pieces, which in turn are formed in one piece on the side panels of the guide carriage housing. It is true that this facilitates production of the radially inner curved guide surfaces if these curved guide surfaces become parts of the guide carriage housing, which can be made, for example, as an injection-molded part or as a cast part of synthetic material or metal. However, this does not solve the problem of costly production of the carriage member because the ribs must still be shorter than the longitudinal extension of the guide carriage member in the direction of the guide rail axis, with the consequence that transverse milling machining of the guide carriage member is necessary in any case.

EP-0,494,682 discloses a linear guide unit wherein reversing plates for radially outer curved guide surfaces of the curved rolling-member guides are mounted on a carriage member of constant profile on its entire length and hence relatively easy to produce. There, the two plates, which are alike, are in each instance joined in one piece with a side panel. Each of these side panels is provided at its end distant from the associated reversing plate with a snap hook, which upon assembly snaps into a hook recess of the other reversing plate in each instance. Positioning of the reversing plates on the carriage member in transverse direction to the guide rail axis is effected by positioning tongues, which engage in positioning grooves on the carriage member running parallel to the axis. Production of the reversing plates with the side panel formed on in each instance and the hook recess formed on in each instance is very costly in terms of shaping technique, even when it is intended to produce these reversing plates by casting or injection molding.

A sealing frame, which has longitudinal sealing lips in position parallel to the guide rail axis and end sealing plates for sealing engagement with the guide rail profile, is provided for sealing off the rolling-element circuit and the lubricant supplied to it. However, this sealing frame does not serve to hold the reversing plates together, but—on the contrary—is supported by the reversing plates held together by the side panels.

Concerning the prior art with regard to linear guide units, reference is additionally made to the following printed sources:

U.S. Pat. No. 4,505,522
Prospectus, THK Bearings of the THK Company Ltd., publication number SA 600,310
Prospectus, THK LM System Linearführungen [Linear Guides], catalog number 100-1 AG
Prospectus, INA Miniaturkugelumlauf, Einheit KUME [Miniature ball circuit, Unit KUME], prospectus number T 452 D -03/92
DE 3,313,575 A1
DE 3,152,257 C2
EP-0,474,948 A1
EP 379,827 A1
DE 3,128,628 A1
U.S. Pat. No. 4,637,739
DE 3,607,592 C2

EP-0,494,682 A2

EP-0,608,832 A2

DE 3,416,207 C2

Prospectus, Franke & Heydrich KG, Franke-Linearführungen mit neuem Kugelumlaufelement KU [Franke linear guides with new ball circuit element KU]

Prospectus, Franke & Heydrich, Einfache und doppelkugel-führungen [Single and double ball guides]

DE-A-2,027,338

SUMMARY OF THE INVENTION

The object of the invention is to design a linear guide unit of the type described at the beginning so that it can be produced more simply.

To accomplish this object, it is proposed that there be inserted in axial direction between the carriage member and the end plate a reversing plate, made separately from the carriage member and the guide carriage housing, on which guide surfaces of the curved rolling-element guide are formed, and that the reversing plate and the carriage member be held together in correct position by the guide carriage housing.

Since in the embodiment according to the invention, the outer curved guide surfaces of the curved rolling-element guides are formed on reversing plates which do not directly serve for holding the guide carriage together, the three-dimensional shape of the reversing plates is formed relatively simply. In addition, this also provides a basis for making the carriage member relatively simply with a minimum number of machining processes. The guide carriage housing likewise obtains a relatively simple three-dimensional shape.

The carriage member, on which great guide forces can appear, may be made relatively inexpensively of steel, for example by cutting off a length of a drawn profile, only relatively minor machining processes being necessary before or after cut-off. The reversing plates and the guide carriage housing, because of their relatively simple three-dimensional shape, may be made precisely with relatively little expenditure for molds, for example, may be cast or molded, specifically of synthetic material or of a metal available for casting or injection molding.

Assembly of the individual parts, i.e., of the guide carriage housing, the carriage member and the reversing plates, is relatively simple despite the increased number of parts, and after assembly the finished carriage meets all requirements for guide accuracy, since this is substantially determined by the guide carriage member, the rolling elements and the guide rail. Since the parts responsible for the curved guidance of the rolling elements and at least in part for the return guidance of the rolling elements as well, namely guide carriage housing and reversing plates, have simple three-dimensional shapes, they can easily be made with sufficient precision to obtain quiet smooth travel of the rolling elements over the respective stretch of the circuit.

Possible rolling elements are, in particular, balls. The method of construction of the linear guide arrangement according to the invention is in principle applicable to all size and performance requirements (load). An especially interesting field of application for the method of construction according to the invention is the production of so-called miniature rail guides which, for example, have guide rails with a base width (measured transverse to the guide rail axis) of 9 mm, a ball diameter of 1.7–2.5 mm, a total height of about 10 mm, these measured from the base surface of the guide rail to the limiting surface of the guide carriage distant from the base, and a carriage length in the direction of the guide rail axis of about 30 mm. Such linear guide arrangements are used in the computer industry, for example, for drives, in the construction of office machines, in the construction of measuring instruments, in semi-conductor manufacture, in precision mechanics, in medical technology, in robot construction and in the manufacture of tool-setting equipment. In principle, the linear guide units according to the invention are suitable for all ancillary guides and at all manual workplaces, including, for example, as retaining means.

The embodiment of a linear guide unit according to the invention may be designed in such fashion that a reversing plate is arranged at either end of the carriage member between the carriage member and an associated end plate of the guide carriage housing.

When, corresponding to widespread practice, for linear guidance at least one rolling-element circuit is provided at each of two lateral surfaces of a guide rail at some distance apart, the guide carriage housing may have a side panel on either side of the guide rail, at least one rolling-element circuit then being provided at each of these side panels.

For simple assembly of the guide carriage according to the invention, it is of advantage when the carriage member and the reversing plate are slipped into the guide carriage housing in a direction orthogonal to the axial direction of the rail and fastened there.

In the linear guide unit according to the invention, it is possible for a radially inner guide surface of the curved rolling-element guide to be mounted on the guide carriage housing and additional, preferably all additional, guide surfaces of the curved rolling-element guide to be mounted on the reversing plate. In this way, the total number of parts making up the guide carriage is reduced, and hence, assembly of the carriage is simplified without substantially increasing the expenditure for precision manufacture.

For series production, manufacture of the guide carriage housing can be simplified in that at least one side panel is made in one piece with the at least one end plate.

Further simplification is possible in that the at least one side panel is made in one piece together with the at least one end plate of castable or moldable material, in particular synthetic material. As a rule, the guide carriage housing is designed as a rectangular frame, this frame preferably having symmetry with regard to a plane of symmetry running through the longitudinal center of the guide carriage and orthogonal to the rail axis, as well as symmetry with regard to a plane of longitudinal symmetry containing the axis of the guide rail.

Side panels and end plates may be made together in one piece, for example of castable or moldable material, in particular synthetic material.

The reversing plates may alternatively be made of castable or moldable material, preferably in one piece, in particular of synthetic material.

A particular advantage of the design according to the invention is that the carriage member may be designed as a profile member which—considered in sectional planes orthogonal to the axial direction of the guide plane—has a constant profile over substantially its entire longitudinal extension parallel to the axial direction. In this way, manufacture of the carriage member becomes extremely simple, and the number of machining operations still necessary after cut-off of a drawn profile length is reduced to a minimum; such machining processes possibly may even be entirely unnecessary. The rolling-element return guide may be formed by cooperating return guide surfaces of the carriage member and housing. This further reduces the number of processing operations, because boring operations in preparation for return guides become unnecessary.

Assembly of the guide carriage may be simplified in that positioning surfaces are formed on the guide carriage housing, on the carriage member or/and on the reversing plate, which surfaces, upon incorporation of the carriage member or the reversing plate in the guide carriage housing, provide for functionally correct positioning of these parts relative to one another. In this method of construction, no special adjusting measures need be used in order to bring the essential parts of the guide carriage into the correct mutual position.

An embodiment suitable for many applications provides at least one rolling-element circuit at either side of a guide rail, i.e., a total of at least two rolling-element circuits; then the guide carriage housing may be designed in the form of a rectangular frame with two side panels and two end plates which are joined together by the side panels. The two side panels and the two end plates then form a positioning well which permits introduction of the carriage member or/and the reversing plate in the direction of introduction. This direction of introduction may then be nearly orthogonal to the rail axis and to a loop plane of the rolling-element circuits.

Generally speaking, it is of advantage when a positioning well for the carriage member and for at least one reversing plate is formed on the guide carriage. There, this positioning well may be designed with lead-in surfaces, serving for introduction of the carriage member and of at least one reversing plate, which permit introduction of the respective part in the direction of approach to the guide rail axis. In addition, the positioning well may have a bottom surface limiting introduction, so that the position of the carriage member or of the reversing plate is definitely fixed by the positioning well. At the same time, at least one reversing piece of a curved rolling-element guide may be mounted on the bottom surface, specifically, in one piece with the bottom surface. This reversing piece is then designed with a radially inner curved guide surface substantially orthogonal to the plane of the loop of an associated rolling-element circuit.

To prepare additional curved guide surfaces, a partially curved guide groove for the rolling elements of the respective curved row of rolling elements may be arranged recessed in a contact surface of a reversing plate turned toward the carriage member, specifically, substantially concentric to the radially inner curved guide surface.

Smooth transition from a curved rolling-element guide to a load-bearing row of rolling elements may be ensured in that a reversing tongue is formed on the reversing plate as part of the curved rolling-element guide, which tongue runs substantially tangential to an associated bearing rolling-element raceway of the guide rail.

For universal applicability of a linear guide unit, it is of importance that the rolling elements of the bearing row of rolling elements on the guide carriage are secured against loss even when the guide carriage is removed from the guide rail. As a rule, filling of the guide carriage with rolling elements, in particular balls, is done by the manufacturer of the carriage, and the user of the carriage can easily slip the carriage onto a guide rail at a later time. To secure the rolling elements of the bearing row of rolling elements in the guide carriage, at least one securing crosspiece may be provided, extending substantially parallel to the axis of the guide rail.

With regard to the aim of simplest possible manufacture and assembly, it is advantageous in this connection that the securing crosspiece be made separately from the reversing plate and the guide carriage housing. In principle, however, it is alternatively possible to slip the guide carriage onto an auxiliary rail, for example, of synthetic material, after the balls have been inserted. In this case, it is possible to eliminate the securing crosspiece.

Mounting of the securing crosspiece may be on the basis that the crosspiece is provided at at least one of its ends with a fastening arm substantially orthogonal to the axis, which is capable of being secured to a part of the guide carriage substantially orthogonal to the axis, preferably an end plate. In guide carriages which are designed symmetrical with regard to their central plane orthogonal to the guide rail axis, a securing crosspiece may be used which, with two fastening arms, is designed substantially U-shaped.

For simple assembly of the guide carriage, there is also a simple method of insertion of the rolling elements and, in particular, the balls. It is therefore additionally proposed that the securing crosspiece be displaceable between a securing position and a ball-insertion position substantially orthogonal to the axis. A prerequisite for this, of course, is that insertion of the balls take place while the guide carriage is removed from the guide rail.

Handling upon insertion of the rolling elements may be designed particularly simply in that for the fastening arm on the end plate, in addition to a first locking position corresponding to the securing position of the securing crosspiece, a second locking position corresponding to the ball-insertion position of the securing crosspiece is provided. Then, the fastening arm is capable of transfer from the second locking position into the first locking position by the effect of pressure and in the first locking position locks automatically and in accurate position.

In order to avoid mutual interference of the securing crosspiece and rolling elements, it is possible for the bearing rolling-element raceway of the guide rail to be formed of two partial raceways which are separated from one another by an accommodating groove for the securing crosspiece. This possibility is known in the prior art. Concerning this, reference is made, for example, to DE 3,313,575 A1 or DE 2,027,338.

For smooth transfer of the rolling elements from the curved rolling-element guide into the load-bearing row of rolling elements, it is of advantage when the securing crosspiece in the transitional region runs from the bearing row of rolling elements to a curved row of rolling elements over an outer surface of a reversing tongue for the rolling elements, which outer surface is turned away from a reversing surface of the reversing tongue.

To secure the rolling elements, it is alternatively possible to allow two securing crosspieces to rest on the load-bearing row of rolling elements on either side of their line of contact with the load-bearing rolling-element raceway of the guide rail, while the mutual distance apart of these two securing crosspieces must then be shorter than the diameter of the rolling elements when these are designed, for example, as balls.

The problem of lubrication in the linear guide unit according to the invention of course arises. This problem may be solved by continuous or periodic supply of lubricant from the outside or alternatively by a life-time filling. Depending upon the viscosity of the lubricant, the problem of sealing of the lubricant then also arises. To solve this problem, on the one hand, a longitudinal seal in sealing position against the guide rail may be mounted on a side panel of the guide carriage housing; on the other hand, on a side of the end plate turned away from the carriage member at least one sealing arrangement may be provided in sealing position against a profile of the guide rail. Provision of this sealing means will not only prevent the loss of lubricant and hence the necessity of frequent relubrication, but will in addition ensure that no lubricant or, in any case only a negligible film of lubricant, will remain on the guide rail outside the respective region of position of the guide carriage.

The sealing arrangement, which is intended to cooperate with the profile of the guide rail, preferably is designed as a sealing plate with a sealing lip resting on the profile of the guide rail.

The carriage member or/and the reversing plate may be secured to the guide carriage housing by snap connection means. Assembly of the guide carriage is additionally facilitated in this way.

A preferred method of construction is characterized in that the reversing plate is secured directly to an end plate by snap connection means and in turn assumes securing of the carriage member within the guide carriage housing by the projections engaging over the carriage member.

A sealing arrangement may alternatively be secured on the guide carriage housing by snap connection means, in particular on the end faces of the end plates distant from the carriage member.

The carriage member will frequently be intended for guidance of a workpiece or a tool or a measuring device on a guide rail. With regard to this, it may be provided that the carriage member is designed for mounting of a structural unit carried by it along the guide rail, in such fashion, for instance, that on the carriage member at least one contact surface, projecting over the guide carriage housing, is designed for the structural unit.

According to another aspect of the invention, it relates to a linear guide unit comprising a guide rail having an axis and at least one guide carriage, movable on this guide rail in the direction of the axis, which runs on the guide rail with intermediacy of at least one endless rolling-element circuit, this rolling-element circuit consisting of a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage, where the rolling elements of the bearing row of rolling elements are secured against loss even when the guide carriage is removed from the guide rail, and where for securing these rolling elements, at least one securing crosspiece is provided, extending parallel to the axial direction of the guide rail. In order, on the one hand, to insert the rolling elements in such a guide carriage easily, but on the other, to be able to retain these rolling elements in the guide carriage without loss before slipping on the guide carriage, it is proposed that the securing crosspiece be displaceable between a securing position and a ball-insert position. There, the securing crosspiece, as already indicated above, may be U-shaped; it may in addition be fixed in the respective position by locking means and steps may be taken, on the one hand, to prevent unintentional displacement of the securing crosspiece but, on the other, nevertheless make its transfer from the rolling-element insert position to the securing position readily possible.

BRIEF DESCRIPTION OF THE DRAWINGS

The invention is explained by means of an example, with the aid of the accompanying figures, wherein.

DETAILED DESCRIPTION OF THE INVENTION

Figure 1:
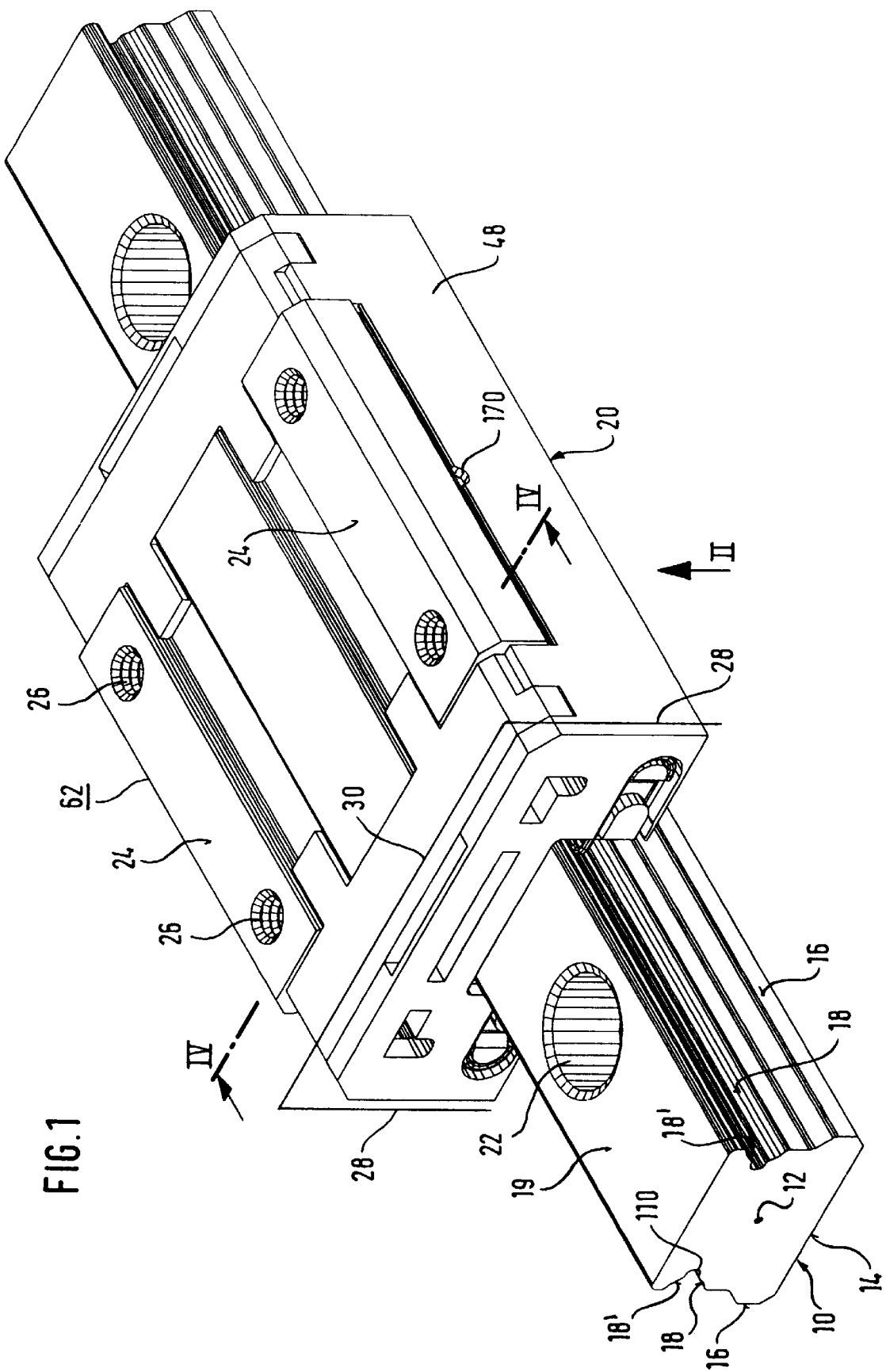
FIG. 1 is a perspective view of the linear guide unit.

In FIG. 1, a guide rail is labeled 10. This guide rail 10 has an axis 12, a base 14, side faces 16 and load-bearing rolling-element raceway areas 18 and 18', which in each instance together form a load-bearing rolling-element raceway 18—18' of the guide rail 10, namely a load-bearing ball raceway 18—18'. A guide carriage 20 runs on the guide rail 10. The guide rail 10 may be supported by its base 14 on a supporting structure, for example the bed of a machine tool or the frame of a measuring device, and may be fastened there by means of fastening bolts which penetrate the guide rail 10 in fastening holes 22. The guide carriage 20 serves to guide a workpiece or a tool along the guide rail 10 and for this purpose is designed with contact surfaces 24 for the tool or workpiece and with fastening holes 26. The design of the guide carriage for the first embodiment is shown in FIGS. 2–6.

Figure 2:
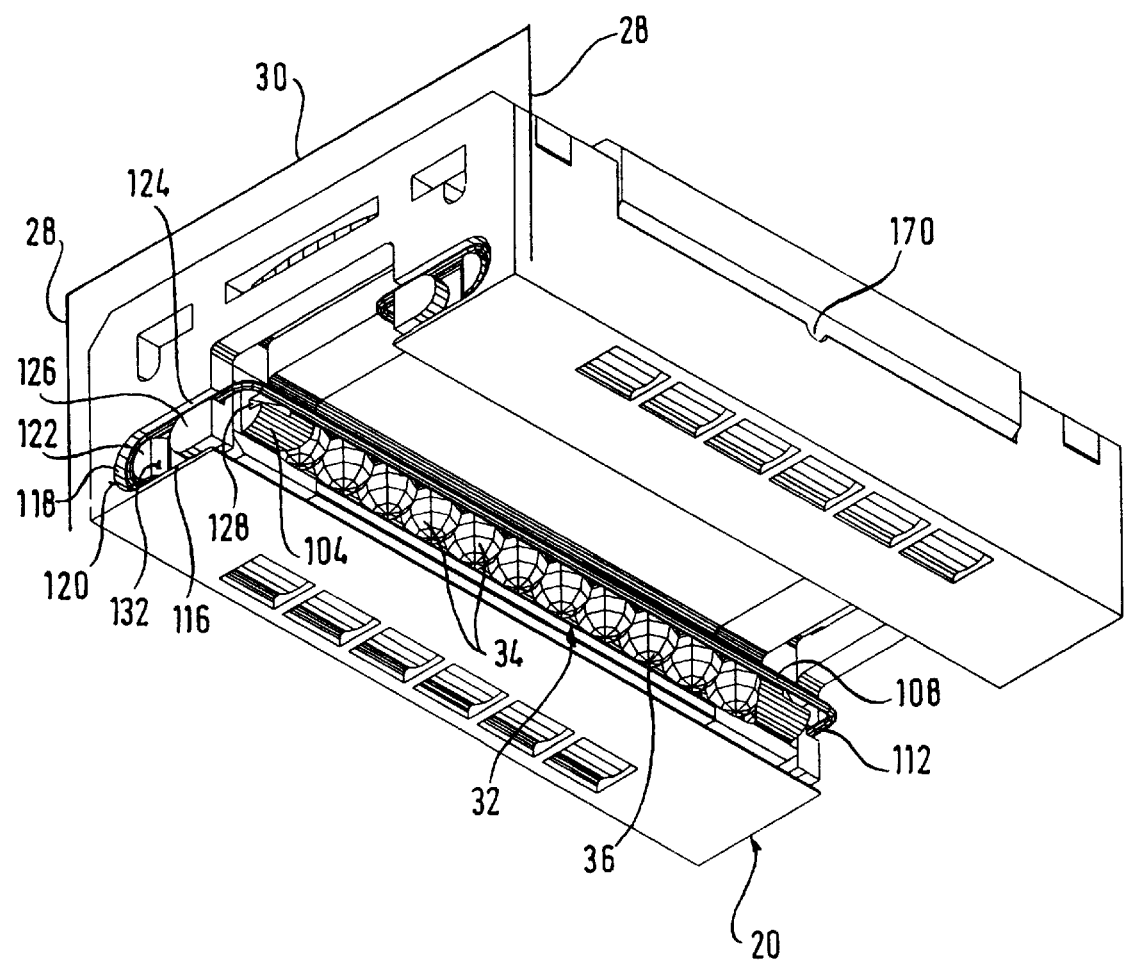
FIG. 2 is a perspective bottom view in the direction of the arrow II of FIG. 1 of the guide carriage.
Figure 4:
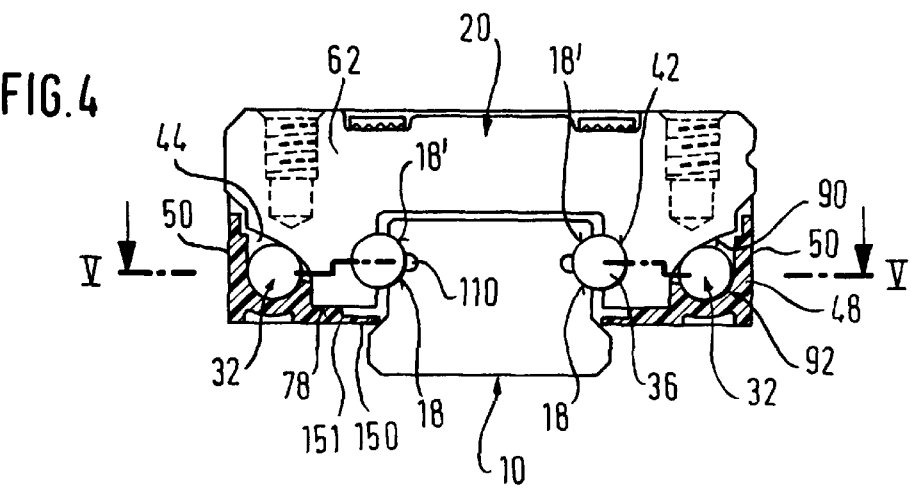
FIG. 4 is a section along line IV—IV of FIG. 1.

In FIG. 2, first of all, the guide carriage 20 is seen to be substantially U-shaped with two arm regions 28 and a crosspiece region 30, which are indicated schematically by lines. The arm regions 28 lie adjacent to the side faces 16 of the guide rail of FIG. 1, while the crosspiece region 30 lies adjacent to the top face 19 of the guide rail 10 of FIG. 1. The guide carriage 20 runs on the load-bearing rolling-element raceways 18—18' via rolling-element circuits 32, which can best be seen in FIGS. 4 and 5. The rolling-element circuits 32 are formed of balls 34 in endless loop arrangement. Each ball circuit 32 has a load-bearing row of balls 36, a returning row of balls 38 and two curved rows of balls 40. The load-bearing row of balls 36 of FIG. 4 runs on the load-bearing raceway 18–18' of the guide rail 10. On the other hand, the load-bearing rows of balls 36 run on load-bearing raceways 42 of the guide carriage 20, as can be seen in FIG. 4. The returning rows of balls 38 run in a ball-return guide 44 of the guide carriage 20, and the curved rows of balls 40 run in curved ball guides 46 of the guide carriage 20.

Figure 3:
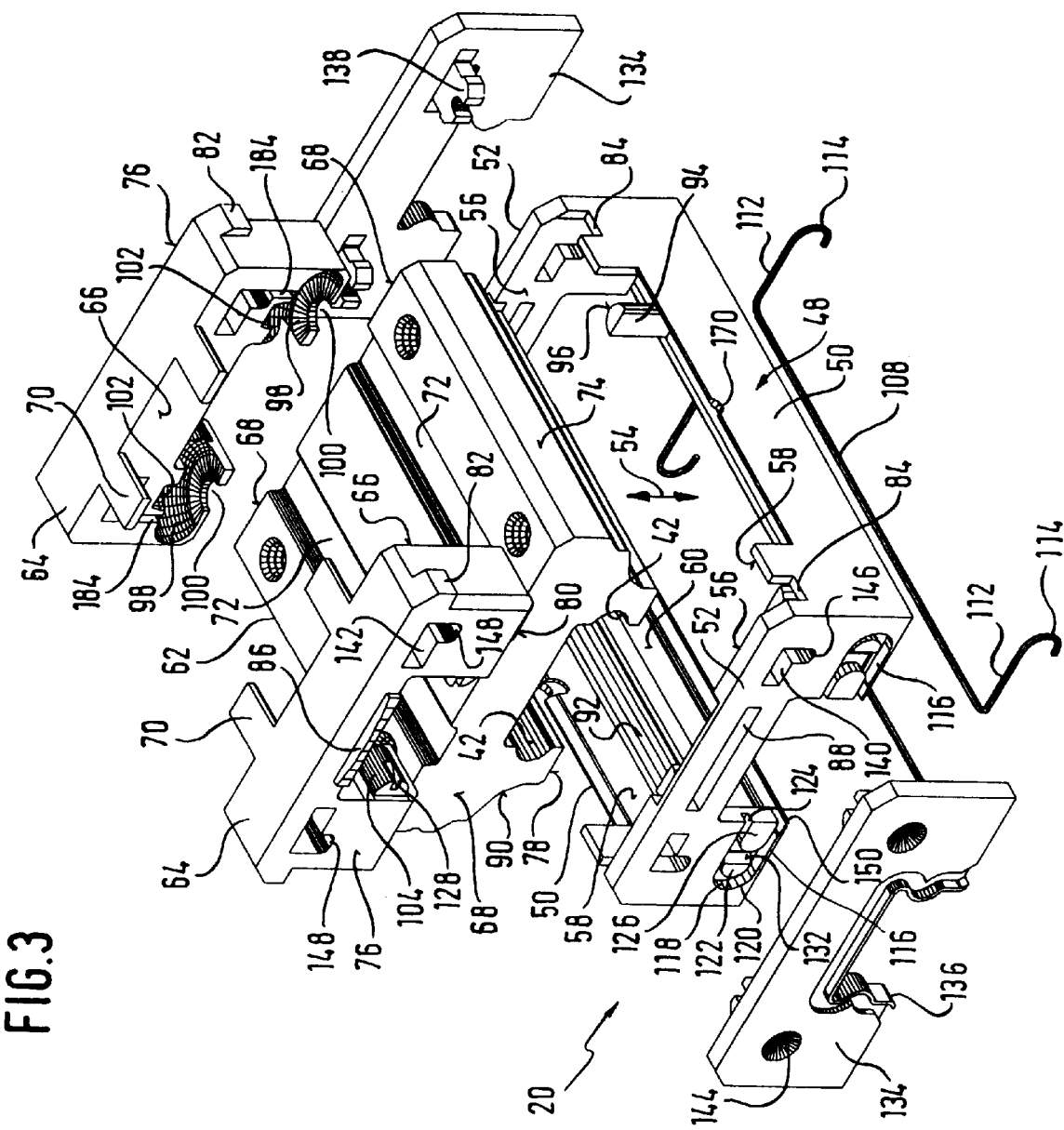
FIG. 3 is an exploded view of the guide carriage of FIG. 1.

FIG. 3 shows the structural design of the guide carriage 20. The guide carriage 20 comprises a guide carriage housing 48 with two side panels 50 and two end plates 52. The side panels 50 and the end plates 52 form a positioning well, indicated by the double-ended arrow 54. This positioning well 54 is limited by lead-in surfaces 56,58 and by a bottom surface 60.

In addition, the guide carriage 20 comprises a carriage member 62 and two reversing plates 64. The plates 64 have contact surfaces 66, which are designed for resting on end surfaces 68 of the carriage member 62 normal to the axis. The reversing plates 64 additionally have projections 70, directed toward one another, which assure the relative positioning of the reversing plates 64 and the carriage member 62 by engaging in longitudinal grooves 72 on the upper side of the carriage member 62. Installation of the carriage member 62 and the reversing plates 64 in the positioning well 54 may be visualized in that the reversing plates 64 are brought to rest on the end surfaces 68 of the carriage member 62 and the projections 70 are engaged in the longitudinal grooves 72 and that the package so formed, held together by hand or by assembly aids, is then lowered into the positioning well 54, while counterguide surfaces 74 of the carriage member 62 are supported on the lead-in surfaces 58, and the end surfaces 76 of the reversing plates 64 located away from the carriage member 62 are supported on the lead-in surfaces 56 of the positioning well 54 until the lower surfaces 78 of the carriage member 62 and the lower surfaces 80 of the reversing plates 64 come to rest on the bottom surface 60. Then, the essential components of the guide carriage 20, namely the guide carriage housing 48, the carriage member 62 and the reversing plates 64, are correctly positioned with respect to one another. Additionally provided for positioning are the projections 82 on the reversing plates 64, which in the assembled state engage in notches 84 of the side panels 50 of the guide carriage housing 48. The reversing plates 64 are secured against lifting out from the positioning well 54 by strips 86, which snap into slots 88 in the course of the movement of introduction into the positioning well 54. For this purpose, the strips 86 may be bevelled, so that upon the movement of introduction into the positioning well 54 the end plates 52 push apart from one another until the strips 86 then fall into the respective slot 88. The hold of the carriage member 62 against lifting out from the positioning well 54 is then ensured by the projections 70 of the reversing plates 64.

Figure 5:
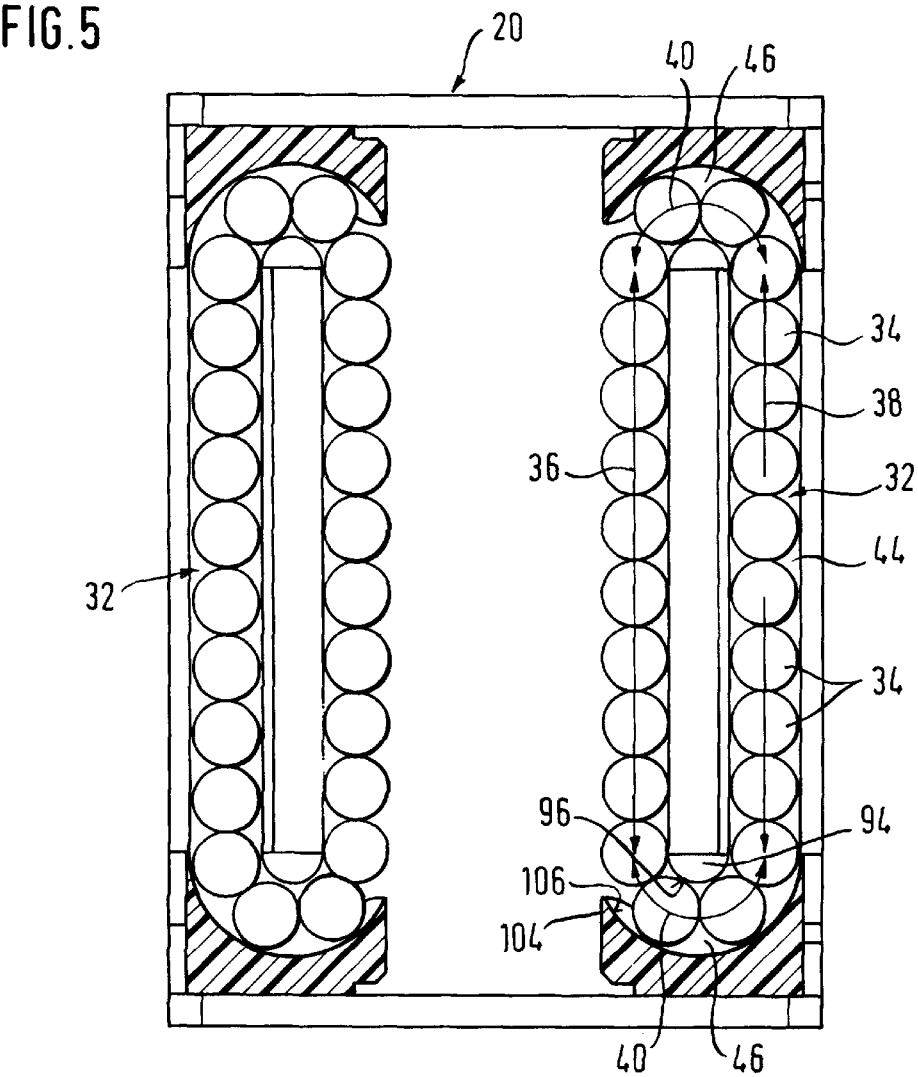
FIG. 5 is a section along line V—V of FIG. 4.

To explain a rolling-element circuit 32, FIGS. 3, 4 and 5 are now referred to simultaneously. The load-bearing row of balls 36 runs on the guide carriage 20 of FIG. 3 on the load-bearing raceway 42, which is a component of the carriage member 62, as appears in FIG. 3. Securing of the balls of the load-bearing row of balls 36 in engagement with the load-bearing raceway 42 of the carriage member 62 will be gone into later.

The ball return guide 44 of FIGS. 4 and 5 is formed, on the one hand, of a return guide raceway 90 of the carriage member 62 and, on the other, of a return guide raceway 92 of the guide carriage housing 48.

In each instance, the curved ball guide, generally labeled 46 in FIG. 5, comprises a reversing piece 94 which is formed in one piece on the bottom surface 60 of the guide carriage housing 48 and presents a radially inner curved guide surface 96. In addition, the curved ball guide 46 comprises a trough 98, which is recessed into the contact surface 66 of the reversing plate 64. At the same time, formed on the reversing plate 64 in the region of the trough 98 are circular recesses 100 and 102 which accommodate the reversing piece 94 so that its radially inner curved guide surface 96, together with the trough 98, produces the half-toric curved ball guide 46. For smooth transfer of the circulating balls 34 from the straight guide segment of the load-bearing row of balls 36 into the curved ball guide 46 and vice versa, reversing tongues 104 (FIGS. 3 and 5) are formed on the reversing plates 64, which tongues have a semicircular profile adapted to the respective associated load-bearing raceway 18—18' of the guide rail 10 and, as can be seen in FIG. 5, decrease in wall thickness toward their tips, so that they form a substantially tangential lead-in surface 106 running into the respective load-bearing raceway 18—18' of the guide rail 10.

Referring to FIGS. 2 and 3, it will now be explained how the balls 34, which in each instance form the load-bearing row of balls 36 are retained on the guide carriage 20, so that even upon separation of the guide carriage 20 from the guide rail 10 these balls 34 cannot come loose from the guide carriage 20. A securing crosspiece, which is made of a piece of wire, is provided for this purpose. In the assembled state of the guide rail 10 and guide carriage 20, this securing crosspiece 108 lies in a longitudinal trough 110 which, as FIGS. 1 and 4 clearly show, separates the two raceway areas 18,18' of the load-bearing raceway 18—18' of the guide rail 10 from one another. This securing crosspiece 108 is fastened to the guide carriage housing 48, as may best be seen in FIG. 3. Formed on the crosspiece 108 are fastening arms 112 which at their ends have semicircular bends 114. The fastening arms 112 are inserted in recesses 116 on the side faces of the end plates 52 located away from the carriage member. Within these recesses 116 two positions are then possible for the fastening arms 112 and hence for the respective securing crosspiece 108. In a first position, the securing position, which is represented in FIG. 2, the semicircular bend 114 engages in a trough 118 of the recess 116 distant from the rail, which is defined by the peripheral limitation 120 of the recess 116 and by a toe 122. In a second position, the ball-filling position, which is represented in FIG. 6, the semicircular bend 114 engages in a trough 124 which is formed within the recess 116 between the toe 122 and an additional toe 126.

As can be seen in FIG. 2, the securing crosspiece 108 in the region of transition to the respective fastening arm 112 can engage in a slot 128 of the reversing tongue 104, so that the crosspiece 108 is held in the correct position.

Figure 6:
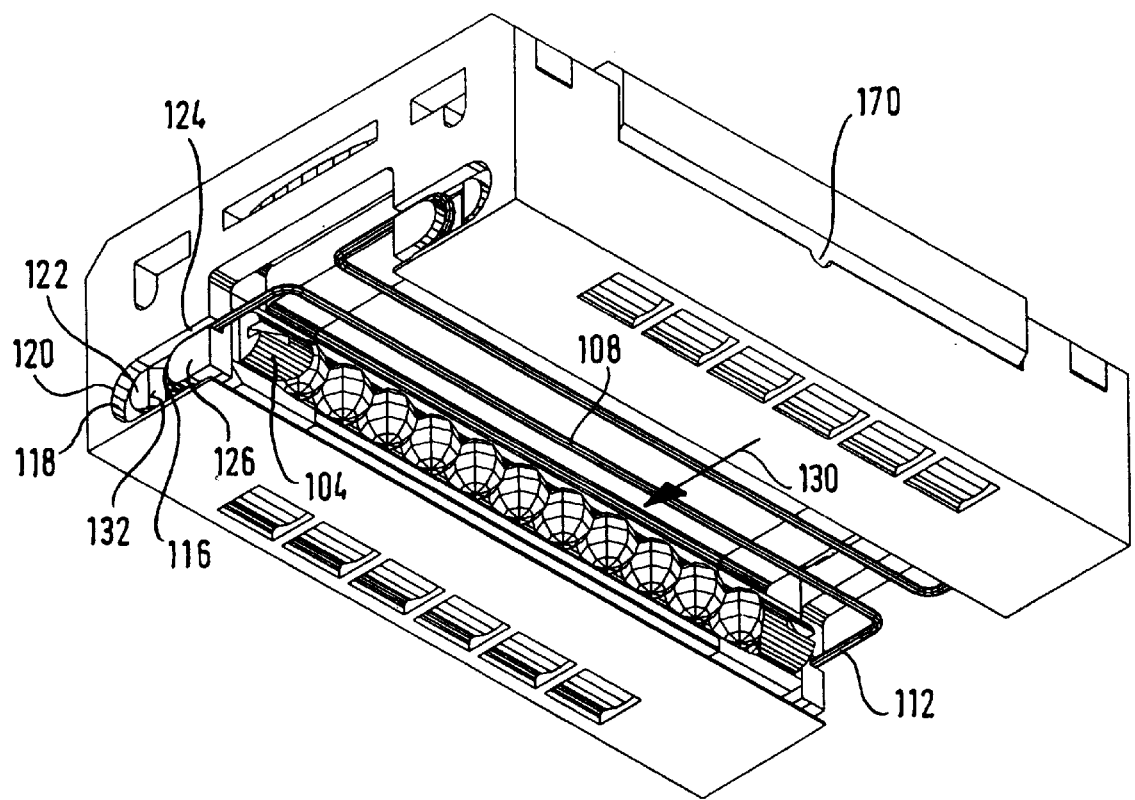
FIG. 6 is a perspective bottom view again in direction of the arrow II of FIG. 1 of the guide carriage, where securing straps for the balls are shown in the fill position.

The ball-filling position of the securing crosspiece 108 can be seen in FIG. 6. There, the crosspiece 108 is lifted off the load-bearing raceway 42 (not represented in FIG. 6, but shown in FIGS. 3 and 4) of the carriage member 62 far enough until the balls 34 in a fill position of the guide carriage, in which the securing crosspiece 108 lies vertically over the horizontally held load-bearing raceway 42 of the carriage member 62, can readily be inserted through the crosspiece 108 and also gradually shifted into the region of the ball return guide 44 and the curved ball guides 46 until the ball circuit 32 is complete. Then, the securing crosspiece 108 need only be shifted, by exertion of pressure in the direction of the arrow 130 of FIG. 6, from the position of FIG. 6 into the position of FIG. 2. The semicircular bends 114 are then forced out of the trough 124 into the trough 118; at the same time their transfer is facilitated by the inclined surface 132 on the toe 122. In the securing position of FIG.

2, the crosspiece 108 is located in the immediate vicinity of, but without contact with, the balls 34 when these rest on the load-bearing raceway 42 of the carriage member 62.

The ball circuits 32 must as a rule be lubricated, and the relatively liquid lubricant supplied to them must be substantially protected against escape from the regions to be lubricated. For this purpose, according to FIG. 3, there are provided sealing plates 134 on which sealing lips 136 are formed. The sealing plates 134 are extruded of synthetic material or rubber, and the sealing lips 136, owing to a thin wall thickness, are so flexible that they rest substantially sealingly on the profile 16–19 of the guide rail 10. The sealing plates 134 are applied to the end surfaces of the end plates 52 located distant from the carriage member and are locked by locking noses 138 of the sealing plates 134 by being snapped into locking recesses 140 of the end plates 52, so as then to engage in back of the end plates 52; there, the locking noses 138 are seated in recesses 142 at the end surfaces 76 of the reversing plates 64. Provided in the sealing plate 134 are lubricant supply holes 144, which in the assembled state are in alignment with channels 148 of the reversing plates 64 for the passage of lubricant. Leakage of lubricant may be prevented by check valves. The risk of escape of lubricant also exists in the gap between the lateral surfaces 16 of the guide rail 10 and the arm regions 28 of the guide carriage 20. For this reason, as can be seen in FIGS. 3 and 4, longitudinal sealing strips 150 are mounted on the side panels 50 of the guide carriage housing 48, which strips may be extruded or cast in one piece with the guide carriage housing of synthetic material or rubber and which owing to a thin thickness of material obtain the flexibility necessary for adhering to the guide rail 10. Lubricating spaces, which extend over all the locations requiring lubrication subjected to the relative motion of balls and ball guide surfaces and which are substantially sealed off, are formed in this way. Loss of lubricant is prevented. Lubricant inevitably coming into contact with the guide rail 10 is always carried along by the guide carriage 20, so that outside the guide carriage 20 no substantial lubricating film remains on the guide rail 10.

It can be seen in FIG. 1 that the contact surface 24 of the carriage member 62 projects upward over the guide carriage housing 48, so that a tool or workpiece may be attached to the contact surface 24 without positioning disturbing the contact with the guide carriage housing 48.

Sufficient precision of the guide is ensured by cooperation of the carriage member 62, the load-bearing row of balls 36 and the guide rail 10. As a rule, these parts are made of steel. The parts as a rule made of synthetic material, namely guide carriage housing 48, reversing plates 64 and sealing plates 134, are subject to precision requirements only insofar as smooth travel of the ball circuits 32 must be secured. This precision is easy to obtain, the more so as fashioning of the parts 48, 64 and 134 is not complicated.

The sealing plates 134 serve for additional securing of the fastening arm 112 in the recesses 116; they may be designed so elastically that the semicircular bends 114, upon transfer of the securing crosspiece 108 from the ball-fill position of FIG. 6 into the ball-securing position of FIG. 2, are nevertheless able to slide past over the toes 122, whereupon slight deflection of the sealing plates 134 takes place.

Figure 7:
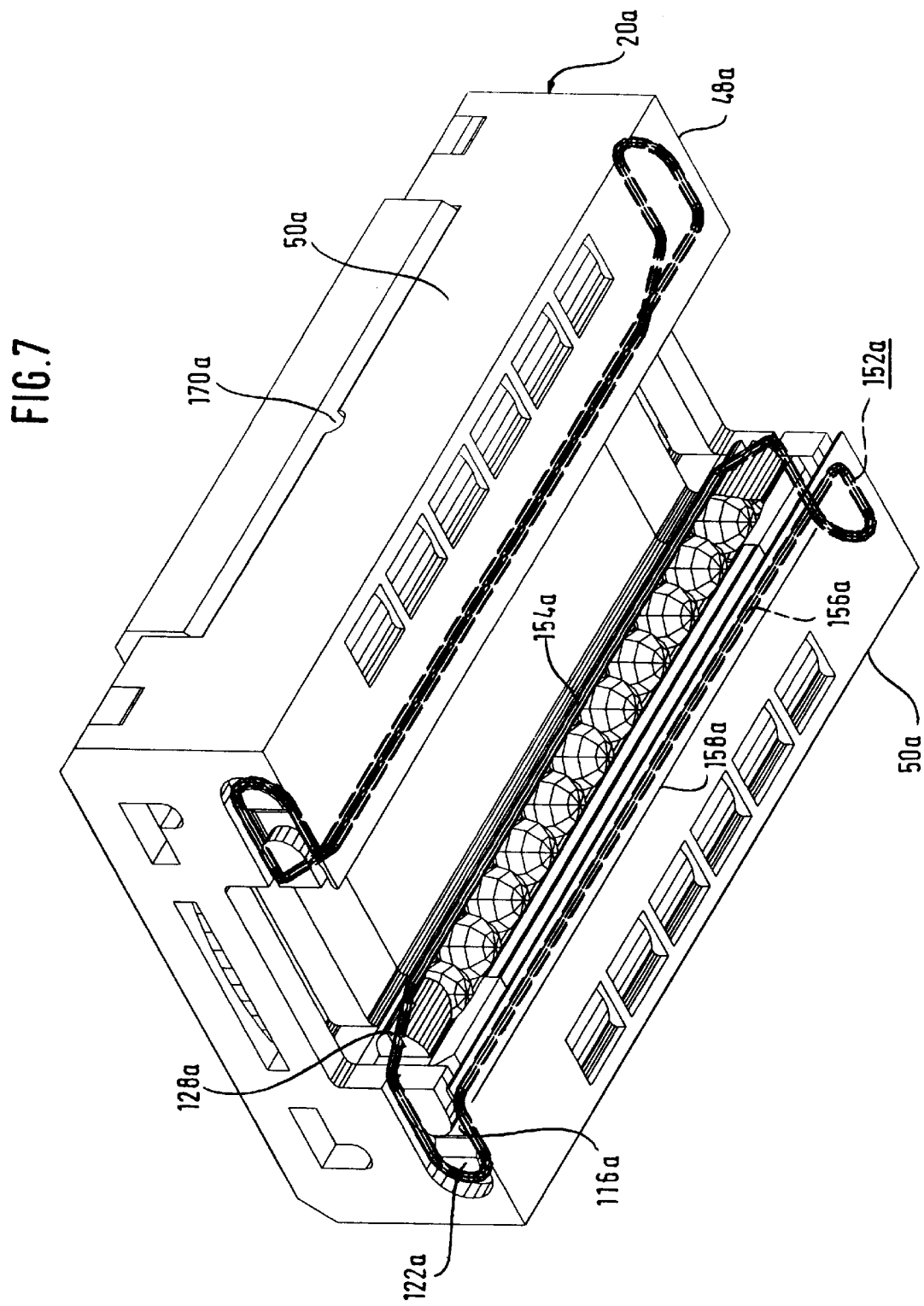
FIG. 7 is a perspective bottom view again in the direction of the arrow II of FIG. 1 of an embodiment modified with regard to ball securing.

The embodiment of FIG. 7 differs from that of FIGS. 1–6 only in a different arrangement for ball securing on the guide carriage 20a. In FIG. 7, similar parts are labeled with the same reference numbers as in FIGS. 1–6, with the addition of the suffix a. The ball securing means is made of a stretched O-ring 152a which is inserted into the recess 116a and hooked into the toe 122a. Here, the longitudinal section 154a of the closed O-ring 152a provides for securing of the balls and the longitudinal section 156a runs along a supporting surface 158a of the side panel 50a, which may be formed, for example, on the lip base 151 of the sealing lip 150 of FIG. 4. Here, the O-ring engages in the slot 128a. Ball fill may be effected here simply by elastic lift-off of the section 154a. The design of the recess 116a could alternatively be simpler here and has been adopted only for the sake of use of a guide carriage housing 48a consistent with the design in FIGS. 1–6.

Figure 8:
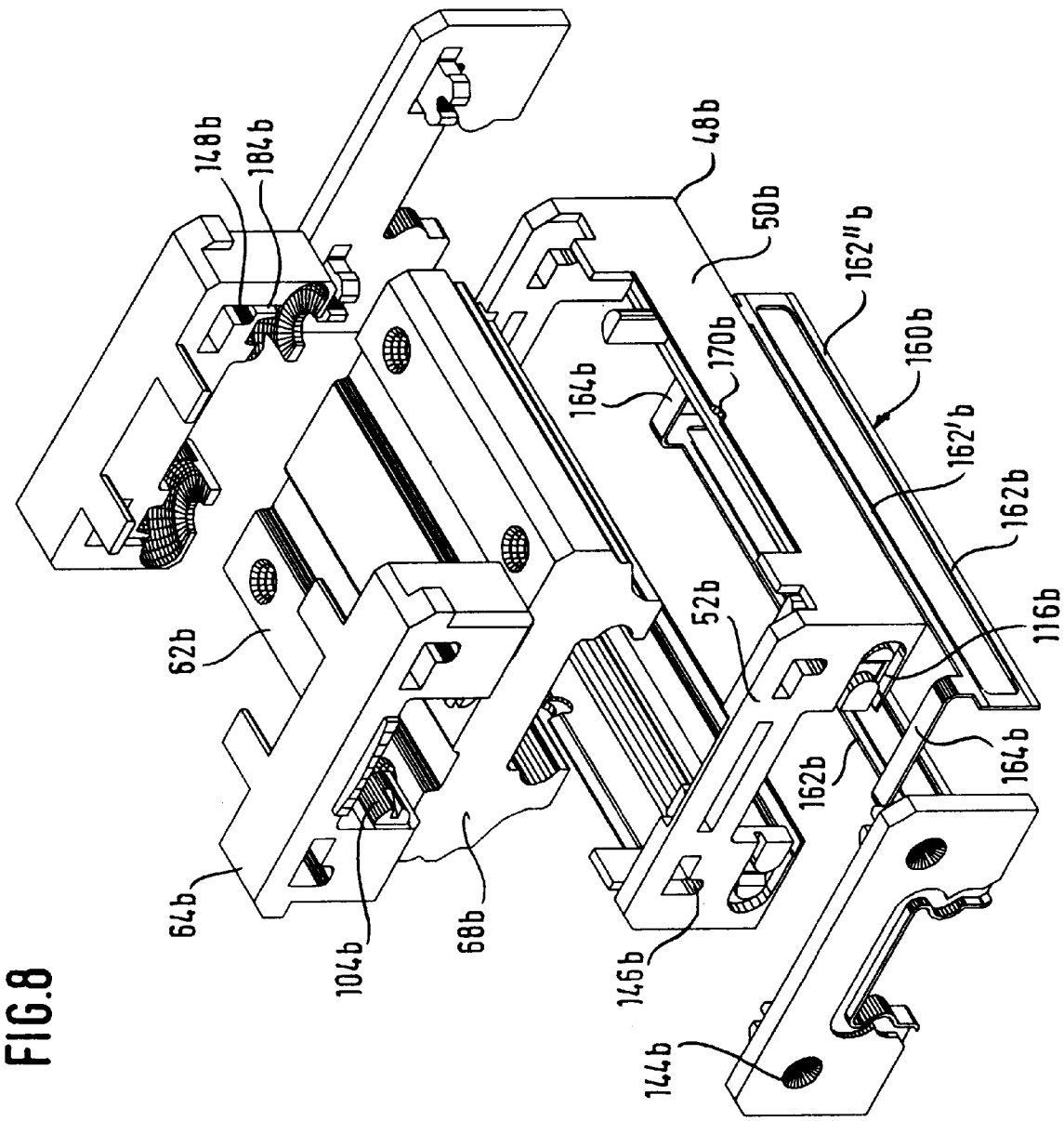
FIG. 8 is an exploded view of another embodiment of the guide carriage as modified with regard to ball securing.
Figure 9:
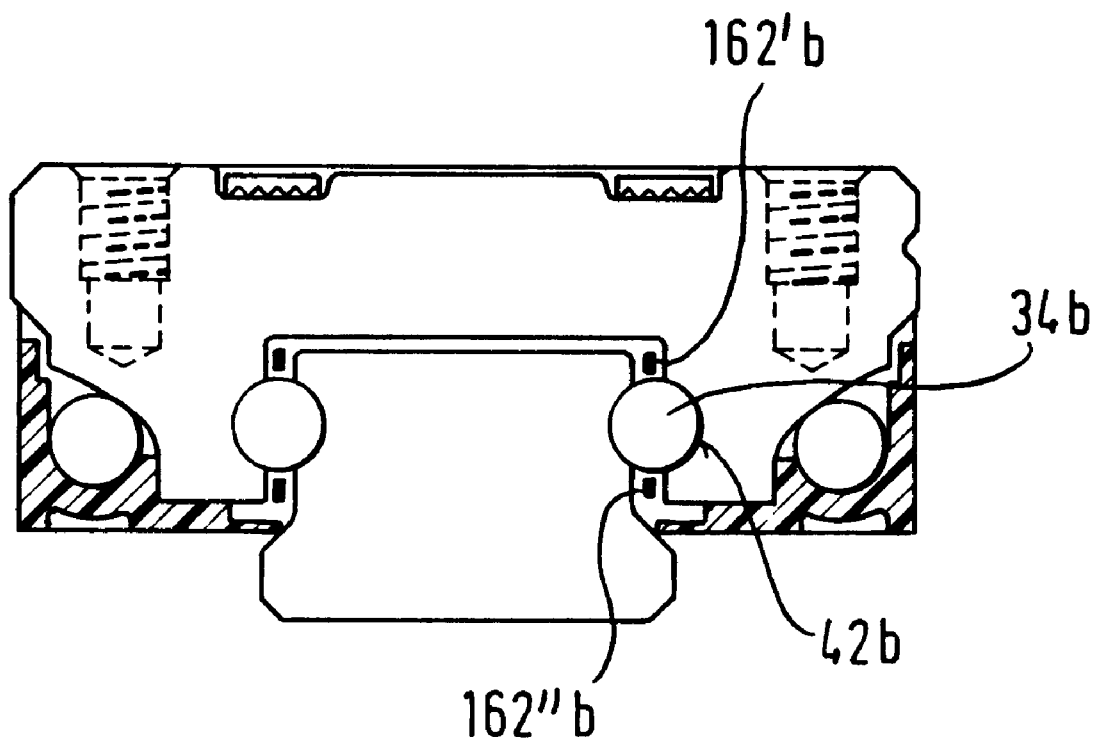
FIG. 9 is a section corresponding to that of FIG. 4 of the embodiment of FIG. 8.

The embodiment of FIG. 8 differs from that of FIGS. 1–6 by still another modified design of the ball securing means. In FIG. 8, similar parts are provided with the same reference numerals as in FIGS. 1–6, in each instance supplemented with b. Here, there is a cage 160b with two double crosspieces 162b which are joined together by connecting strips 164b. Fixing is effected on the reversing tongues 104b, which upon assembly of the cage 160b, may be snapped in between the sheet-metal strips 162'b and 162"b forming the respective double crosspiece. There, ball fill may be effected by elastic deflection of the metal strips 162'b, 162"b. Then, the recesses 116b may be omitted, unless they are desired for reasons of standardization in order to be able to use the same guide carriage housing 48b as in the embodiment of FIGS. 1–6. In FIG. 9 are seen two metal strips 162'b and 162"b, whose distance apart is less than the ball diameter, so that the balls 34b are held in engagement with the load-bearing raceway 42b.

The linear guide unit according to the invention alternatively may be made with two superposed pairs or three superposed pairs of ball circuit guides.

The raceways 42 may be hardened. The reversing tongues 104 may alternatively be viewed as reversing blades which, if desired, may rest blade-like from the bearing raceways 18—18' on the guide rail and scoop lubricant from them and pass it on to the curved guides 46.

The securing crosspiece 108 and their fastening parts may consist of spring steel wire, spring steel sheet metal or elastic material.

In the case of the embodiment of FIG. 7, the sealing lips 136 alternatively may be formed by the O-ring sections 156a.

According to another aspect of the invention, the guide carriage may be provided with at least one lubricant supply hole accessible from outside. This permits one-time, routine or periodic supply of lubricant to the rolling-element circuit without any problem.

To prevent escape of the lubricant, the lubricant supply holes or at least one of such holes may be provided with check valves.

The lubricant supply hole may be arranged, for example, on the guide carriage in the region of at least one end plate. In this case, connection of the lubricant supply hole with the rolling-element circuit may be such that the lubricant supply hole, via at least one lubricant channel extending in axial direction over the end plate and the reversing plate, is connected with the rolling-element circuit and the lubricant channel discharges into the rolling-element circuit in the region of a curved rolling-element race. This makes it possible for the lubricant channel to pass through the end plate. In addition, the lubricant channel may pass through the reversing plate. However, it is alternatively possible for the lubricant channel in the bridging region of the reversing plate to be formed by an open lubricant groove in an end face of the reversing plate parallel to the axis, this open groove being covered by the adjoining side panel of the guide carriage housing. The lubricant channel may have a terminal section near its discharge into the respective rolling-element circuit, which is formed by a trough in the end plate lying open toward the carriage member, this open trough being covered by rest on an associated end surface of the carriage member normal to the axis. Thus, the lubricant reaches the rolling-element circuit directly after its exit from the lubricant channel.

The channel for the passage of lubricant may be formed on the guide carriage housing in such fashion that it has an end section near the lubricant supply hole which passes through a sealing plate adjoining an end plate.

However, it is alternatively possible for the lubricant supply hole to be provided at a region of the end plate not covered by the sealing plate. In this embodiment, care must only be taken to see that the lubricant channel continues in the transitional endplate/reversing plate region; this embodiment is suitable in complicated connection designs which lend themselves more easily to mounting or forming on end plates ordinarily consisting of harder material. Then, end plate and sealing plate may be designed so that the sealing plate has a recess and a projection, projecting away from the carriage member in axial direction, is arranged on the end plate whose end face located away from the carriage member has the lubricant supply hole, and so that the projection is as least partly accommodated by a marginal recess of the sealing plate. In this connection, the projection advantageously is substantially complementary to the marginal recess, so that a smooth attractive external appearance is produced.

In addition or as an alternative to the possibility of lubricant supply in an end region of the guide carriage, at least one lubricant supply hole may be arranged in the region of a side panel and/or a lateral face of the guide carriage running parallel to the side panel. In this way, the supply of lubricant may be effected through a side panel or a lateral face or/and through the end section of the guide carriage, depending upon the space available and assembly conditions. The lubricant supply hole may be arranged in the impact region between an edge of the side panel and an adjoining region of the carriage member. In order to guide the lubricant to the rolling-element circuit in the direct and shortest way, the lubricant supply hole may run in a plane substantially orthogonal to the axis—preferably rectilinearly—to the returning row of rolling elements.

According to another possible embodiment, the securing crosspiece is designed at the end of its orthogonal fastening arm with securing arms which are substantially parallel to the axis and extend securingly into securing arm-accommodating recesses of the end plate and, if desired, alternatively of the reversing plate. This ensures especially firm seating of the securing crosspiece. For ball fill, the crosspiece may be deflected in its central region. In this embodiment, too, however, additional accommodating recesses can provide for a fill position of the crosspiece. In the assembled state of the guide carriage, the fastening arm may be accommodated in a relief-like accommodating slot of an end plate and/or of an adjoining sealing plate.

FIGS. 10–13 show a somewhat modified embodiment of the linear guide arrangement. In FIGS. 10–13, similar parts are identified with the same reference numerals as in FIGS. 1–6, with the addition of suffix c.

Figure 10:
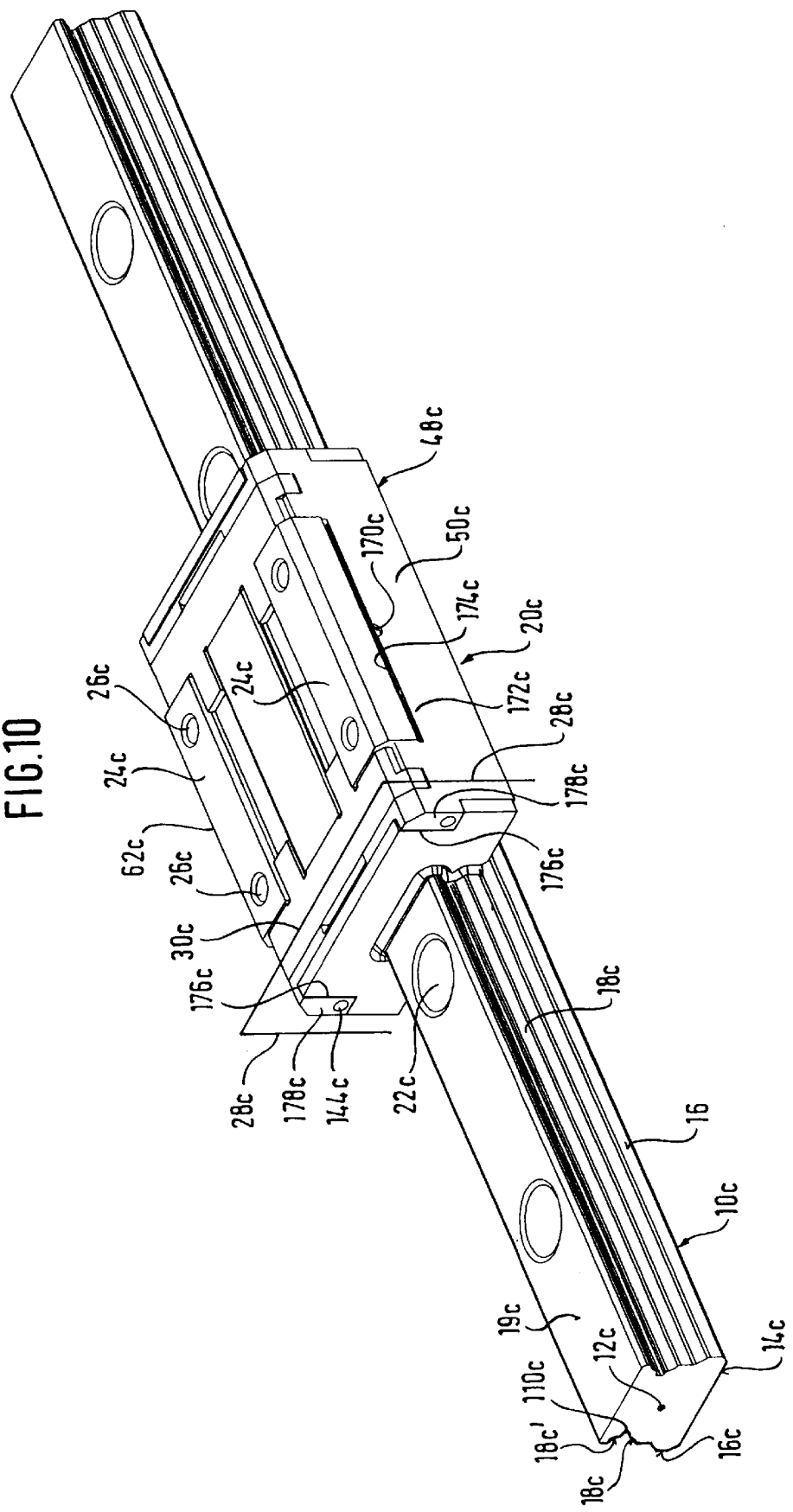
FIG. 10 is a perspective view of the linear guide arrangement of FIG. 1 with a modified embodiment with regard to the sealing plate.
Figure 11:
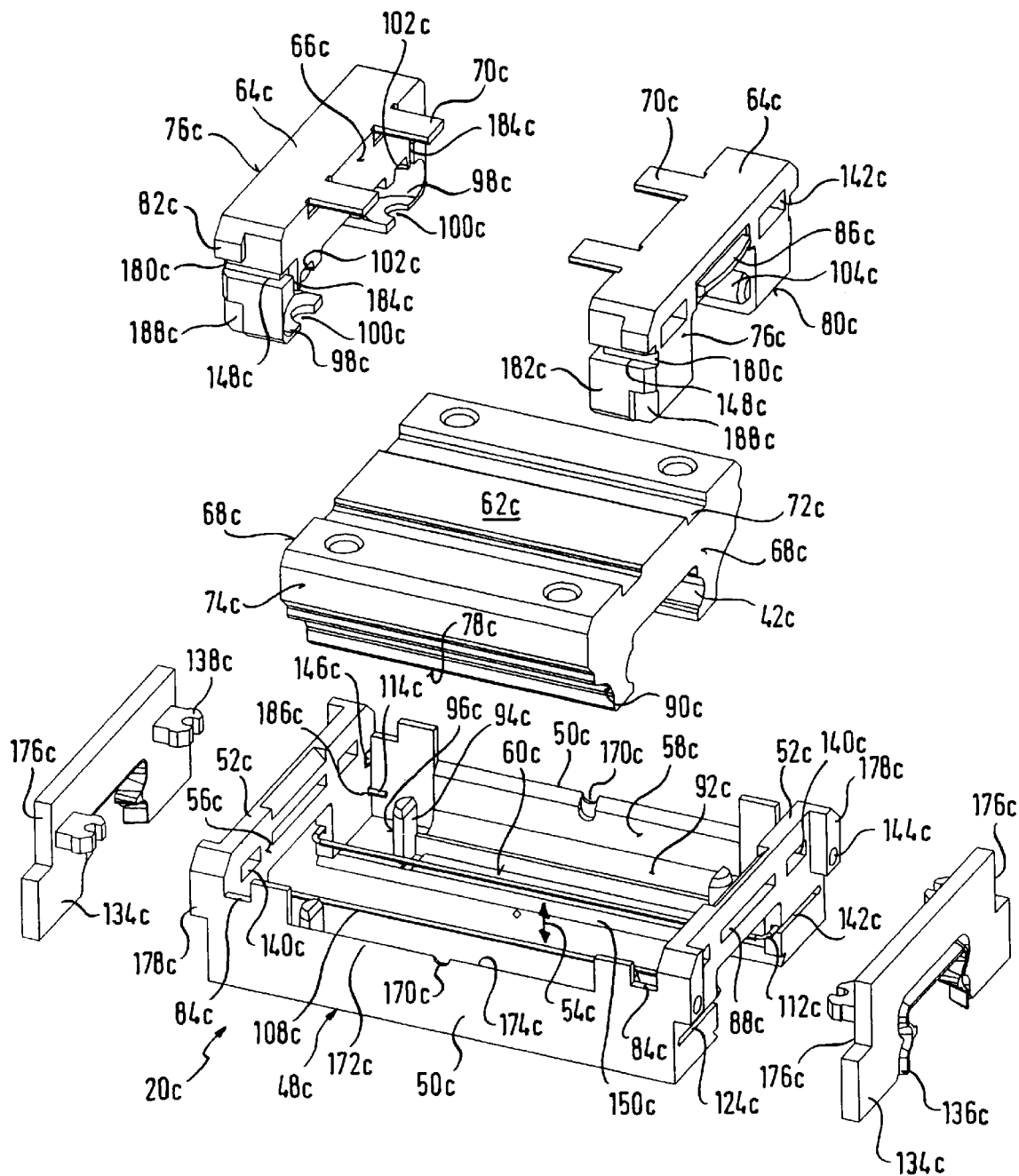
FIG. 11 is an exploded view of the linear guide arrangement represented in FIG. 10.
Figure 12:
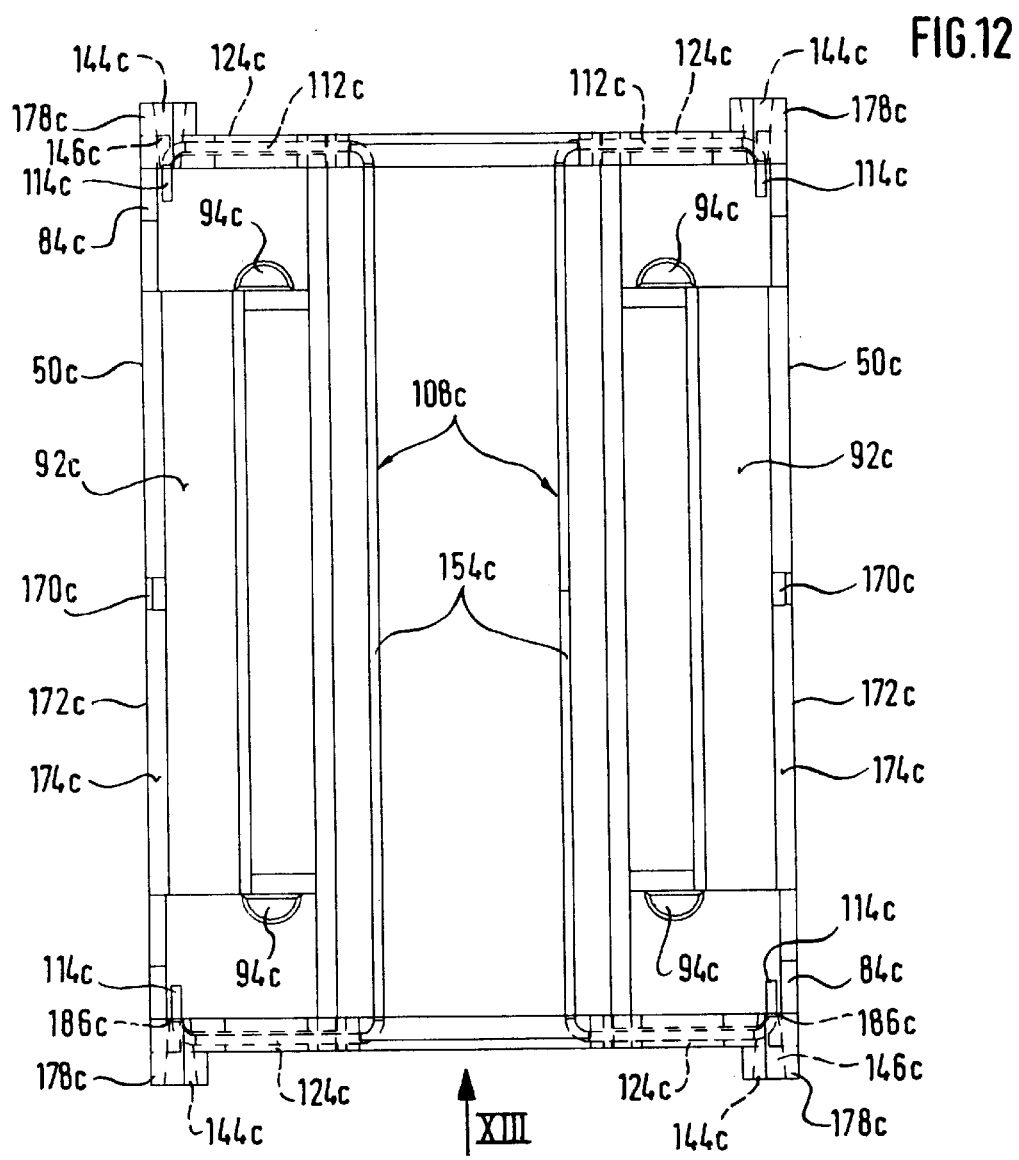
FIG. 12 is a top view of the guide carriage housing of the embodiment of FIG. 11 with inserted securing crosspiece.

FIGS. 10–12 show a lubricant supply hole 170*c*, provided on the side panel 50*c* of the guide carriage housing 48*c*, through which lubricant can be supplied to the return guide race 92*c*. The lubricant supply hole 170*c* is formed in the impact region between one edge 172*c* of the side panel 50*c* of the guide carriage housing 48*c* and an adjoining region of the carriage member 62*c* in the upper edge 174*c* of the side panel 50*c*. In the assembled state of the guide carriage 20*c*, the lubricant supply hole 170*c* is limited toward the top by the carriage member 62*c*.

The lubricant supply hole 170*c* runs rectilinearly in a plane orthogonal to the axis 12*c* (FIG. 10). If desired, a plurality of lubricant supply holes 170*c* may be provided on the respective side panel 50*c*. In addition, the lubricant supply hole 170*c* alternatively may be formed by a hole made in the side panel 50*c* which discharges into the return guide raceway 92*c*. Escape of lubricant may be prevented by check valves.

The lubricant supply holes 170*c* described with reference to FIGS. 10–12 are also located in the embodiments already described, where they are identified by analogous reference numerals.

In the following description of the embodiment of FIGS. 10–13, only the differences between this embodiment and the embodiment of FIGS. 1–6 will be discussed, namely another design of sealing plate 134*c* and end plate 52*c* of the guide carriage housing 48*c*, as well as another configuration of the securing crosspiece 108*c*.

It may be seen in FIGS. 10 and 11 that the sealing plate 134*c* mounted on the end face of the end plate 52*c* distant from the carriage member 62*c* has lateral recesses 176*c*. At the end plate 52*c* of the guide carriage housing 48*c*, projections 178*c* projecting in axial direction of the carriage member 62*c* project into these recesses 176*c*. These projections 178*c* are designed complementary to the recesses 176*c*, so that they completely fill the recesses 176*c*.

In the embodiment of FIGS. 10–13, the lubricant supply hole 144*c* in the projection 178*c* is formed on the end plate 52*c*. The lubricant supply hole 144*c* continues as the lubricant channel 146*c* passing through the end plate 52*c*. The lubricant channel 146*c* passes through the plate 52*c* in axial direction and subsequently is in alignment with the lubricant channel 148*c* in the reversing plate 64*c*. This channel 148*c* is designed as an open lubricant groove 180*c* in an end face 182*c* of the reversing plate 64*c* parallel to the axis 12*c*. In the assembled state of the guide carriage 20*c*, the lubricant groove 180*c* is covered by the adjoining side panel 50*c* of the guide carriage housing 48*c*.

The opening into the trough 98*c* of the curved ball guide is formed by a trough 184*c*, which represents the end section of the lubricant channel 148*c* near the rolling-element circuit. The trough 184*c* is formed in the reversing plate 64*c* and is open toward the carriage member 62*c*, but in the assembled state of the guide carriage 20*c* is covered by rest on the associated end face 68*c* of the carriage member 62*c* near the axis. Accordingly, in the assembled state, the lubricant supply hole 144*c* is in alignment with the lubricant channel 146*c* of the end plate 52*c* and the lubricant channel 148*c* of the reversing plate 64*c*, each of which runs in the axial direction 12*c*.

Figure 13:
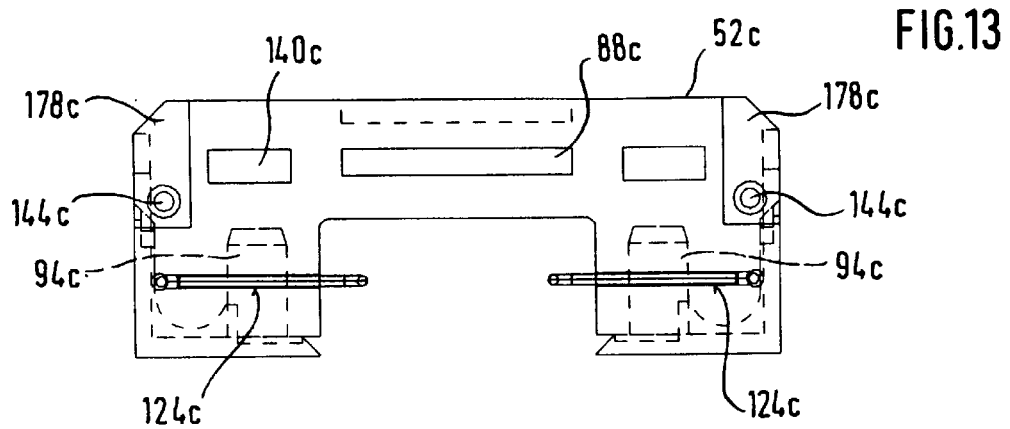
FIG. 13 is an end view of the guide carriage housing in the direction of the arrow XIII of FIG. 12.

The modified design of the securing means can also be seen in FIGS. 11–13.

The securing crosspiece 108*c*, like the securing crosspiece 108 (FIGS. 1–6), is made of a piece of wire. Unlike the cross-piece 108, the crosspiece 108*c* in each instance has a securing arm 114*c* at the end of its orthogonal fastening arm 112*c*. The securing arms 114*c* run parallel to the axis 12*c* and point toward one another.

The fastening arms 112*c* are each recessed into relief-like accommodating slots 124*c* on the end plates 52*c*. The crosspiece 108c is fastened to the guide carriage housing 48c, as may be seen best in FIG. 11. The securing arms 114c in each instance are slipped into securing-arm accommodating recesses and pass through them. In the assembled state, the securing arms 114c extend into securing arm-accommodating recesses 188c formed laterally on the reversing plate 64c.

In this embodiment, ball fill may be effected by deflection of the securing crosspiece section 154c, particularly in the central region in each instance. The embodiment of the crosspiece 108c described above is characterized in particular by good firm seating of the crosspiece 108c.

Although the invention has been described and illustrated herein by reference to specific embodiments thereof, it will be understood that such embodiments are susceptible of modification and variation without departing from the inventive concepts disclosed. All such modifications and variations, therefore, are intended to be encompassed within the spirit and scope of the appended claims.

We claim:

1. A linear guide arrangement, comprising:
   a guide rail having an axis and at least one guide carriage, movable on the guide rail in the direction of the axis, which runs on the guide rail with intermediacy of at least one endless rolling-element circuit;
   said rolling-element circuit including a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage;
   said guide carriage including a guide carriage housing and a carriage member made separately from and accommodated within the guide carriage housing; said guide carriage housing comprising at least one side panel adjacent to the rolling-element circuit and substantially parallel to the axial direction, and at least one end plate adjacent to one of the curved rows of rolling elements and substantially orthogonal to the axial direction;
   said bearing row of rolling elements running on the carriage member;
   a reversing body, made separately from the carriage member and the guide carriage housing, inserted axially between the carriage member and the end plate, said reversing body participating in establishing a respective one of said curved rolling-element guides, the reversing body and the carriage member being held together in correct position by the guide carriage housing;
   a positioning well being confined by said guide carriage housing for accommodating said carrige member and said reversing body, said positioning well having lead-in surfaces defining a direction of insertion for said carriage member and said reversing body,
   said reversing body and said carriage member having respective positioning surfaces, which are effective to secure a correct operational position of said reversing body with respect to said carriage member, and
   at least one snap element securing said carriage member and said reversing body in a correct operational position with respect to said guide carriage housing in response to insertion movement along said direction of insertion, said snap element maintaining mutual engagement of said positioning surfaces.

2. The linear guide arrangement according to claim 1, wherein a reversing body is arranged at either end of the carriage member between the carriage member and an associated end plate of the guide carriage housing.

3. The linear guide arrangement according to claim 1, wherein:
   at least one rolling-element circuit is provided at each of two lateral surfaces of the guide rail at some distance apart; and
   the guide carriage housing has a side panel on either side of the guide rail.

4. The linear guide arrangement according to claim 1, wherein the carriage member and the reversing body are slipped into the guide carriage housing in a direction orthogonal to the axial direction of the rail and fastened there.

5. The linear guide arrangement according to claim 1, wherein a radially inner guide surface of the curved rolling-element guides is mounted on the guide carriage housing.

6. The linear guide arrangement according to claim 1, wherein said at least one side panel is made in one piece with said at least one end plate.

7. The linear guide arrangement according to claim 6, wherein said at least one side panel is made in one piece together with the at least one end plate of castable or moldable material.

8. The linear guide arrangement according to claim 1 or 7, wherein the reversing body is made of castable or moldable material.

9. The linear guide arrangement according to claim 1, wherein the carriage member comprises a profile member which—considered in sectional planes orthogonal to the axial direction—has a constant profile over substantially its entire longitudinal extension parallel to the axial direction.

10. The linear guide arrangement according to claim 1, wherein the rolling-element return guide is formed by cooperating return guide surfaces of the carriage member and the guide carriage housing.

11. The linear guide arrangement according to claim 1, wherein positioning surfaces are formed on the guide carriage housing, on the carriage member or/and on the reversing body, which positioning surfaces, upon incorporation of the carriage member or the reversing body in the guide carriage housing, provide for the functionally correct positioning of said parts relative to one another.

12. The linear guide arrangement according to claim 1, wherein:
   the guide carriage has at least one pair of rolling-element circuits lying at either side of the guide rail; and
   the guide carriage housing comprises a rectangular frame with two side panels and two end plates, said side panels and said end plates forming a positioning well which permits introduction of the carriage member or/and the reversing body in the direction of introduction, which direction of introduction is nearly orthogonal to the rail axis and to a loop plane of the rolling-element circuits.

13. The linear guide arrangement according to claim 1, wherein:
   a positioning well for the carriage member and for at least one reversing body is formed on the guide carriage housing, said positioning well having lead-in surfaces, serving for the introduction of the carriage member and at least one reversing plate in the direction of approach to the axis, and a bottom surface limiting introduction; and at least one reversing piece of a curved rolling-element guide is provided on the bottom surface, said reversing piece forming a radially inner curved guide surface substantially orthogonal to the plane of a loop of an associated rolling-element circuit for said associated rolling-element circuit.

14. The linear guide arrangement according to claim 13, wherein said guide trough is substantially concentric to the radially inner curved guide surface.

15. The linear guide arrangement according to claim 14, wherein a reversing tongue is formed on the reversing body as part of the curved rolling-element guide, which tongue runs substantially tangential to an associated bearing rolling-element raceway of the guide rail.

16. The linear guide arrangement according to claim 1, including means for securing the rolling elements of the bearing row of rolling elements on the guide carriage against loss even when the guide carriage is removed from the guide rail.

17. The linear guide arrangement according to claim 16, wherein said rolling elements securing means comprises at least one securing crosspiece, which extends substantially parallel to the axis of the guide rail.

18. The linear guide arrangement according to claim 17, wherein the securing crosspiece is made separately from the reversing body and the guide carriage housing.

19. The linear guide arrangement according to claim 17 or 18, wherein the securing crosspiece is provided at at least one of its ends with a fastening arm substantially orthogonal to the axis, which fastening arm is capable of being secured to a part of the guide carriage which is substantially orthogonal to the axis.

20. The linear guide arrangement according to claim 19, wherein the securing crosspiece has two fastening arms and is substantially U-shaped.

21. The linear guide arrangement according to claim 19, wherein said securing crosspiece at the end of its orthogonal fastening arm has securing arms which are substantially parallel to the axis and extend securingly into securing arm-accommodating recesses of the end body or the reversing plate.

22. The linear guide arrangement according to claim 20, wherein:

said reversing body is inserted axially between said carriage member and said end plate by introducing said reversing body into said carriage housing in a direction transverse to the axial direction; and mutually engageable abutment surfaces are provided on said reversing body and said guide carriage housing for transversely positioning the reversing body relative to the carriage member, upon introduction of said reversing body into said guide carriage housing, such that said lower portion of said radially outer guide surface is flush with said lower surface of said rolling-element return guide.

23. The linear guide arrangement according to claim 19, wherein the securing crosspiece is displaceable between a securing position and a ball-insertion position substantially orthogonal to the axis.

24. The linear guide arrangement according to claim 23, wherein the end plate includes a first locking position for the fastening arm, corresponding to the securing position of the securing crosspiece, and a second locking position for the fastening arm, corresponding to the ball-insertion position of the securing crosspiece.

25. The linear guide arrangement according to claim 24, wherein the fastening arm is capable of transfer from the second locking position to the first locking position by the effect of pressure and in the first locking position locks automatically.

26. The linear guide arrangement according to claim 17, wherein two securing crosspieces rest on the load-bearing row of rolling elements on either side of the line of contact thereof with the load-bearing roller-element raceway of the guide rail.

27. The linear guide arrangement according to claim 17, wherein the securing crosspiece extends from the bearing row of rolling elements to a curved row of rolling elements over an outer surface of a reversing tongue for the rolling elements, which outer surface is turned away from a reversing surface of the reversing tongue.

28. The linear guide arrangement according to claim 17, wherein the bearing rolling-element raceway is formed of two partial raceways which are separated from one another by an accommodating groove for the securing crosspiece.

29. The linear guide arrangement according to claim 1, wherein said positioning surfaces comprise limiting surface portions of longitudinal grooves provided in a surface of the carriage member, which extend substantially in the axial direction, and surface portions of projections of said reversing body, which are adapted to engage into the longitudinal grooves.

30. The linear guide arrangement according to claim 1, wherein said positioning surfaces are effective to position said reversing body with respect to said carriage member along a direction, which is orthogonal to said direction of insertion and orthogonal to the axial direction.

31. A linear guide arrangement according to claim 1, wherein said reversing body is provided in a contact surface thereof facing the carriage member with a curved guide trough, said curved guide trough being in substantially axial alignment at its respective ends with said bearing row of rolling-elements and said returning row of rolling-elements and including a face of substantially semi-circular cross section which defines the radially outer guide surface of said curved rolling-element guide, said radially outer guide surface surrounding said rolling elements over substantially one half of their circumferences.

32. The linear guide arrangement according to claim 1, wherein: said position well is formed on the guide carriage housing, said positioning well having a bottom surface limiting introduction of the carriage member and the reversing body in the direction of approach to the axis; and at least one reversing piece of a curved rolling-element guide is provided on the bottom surface, said reversing piece forming a radially inner curved guide surface substantially orthogonal to the plane of a loop of an associated rolling-element circuit for said associated rolling-element circuit.

33. The linear guide arrangement according to claim 1, wherein the carriage member includes means for mounting of a structural unit carried by it along the guide rail.

34. The linear guide arrangement according to claim 33, wherein said mounting means includes at least one contact surface on the carriage member, projecting over the guide carriage housing, for supporting the structural unit.

35. The linear guide arrangement according to claim 1, wherein the snap element includes a snap secure connector securing the carriage member or/and the reversing plate to the guide carriage housing.

36. The linear guide arrangement according to claim 35, wherein the sealing arrangement comprises a sealing plate with a sealing lip resting on the profile of the guide rail.

37. The linear guide arrangement according to claim 1, wherein the guide carriage is provided with at least one lubricant supply hole accessible from outside.

38. The linear guide arrangement according to claim 1, wherein said bearing row of rolling elements is secured on said load bearing raceway of said carriage member by an elongated securing member extending along said load bearing raceway in axial direction and in distance from said load bearing raceway substantially corresponding to the diameter of said rolling elements, said elongated securing member extending through said at least one end plate and being fastened to said end plate on the side thereof remote from said reversing body.

39. The linear guide arrangement according to claim 38, wherein the lubricant supply hole is connected to the rolling-element circuit by at least one lubricant channel extending in the axial direction through an endplate and a reversing body.

40. The linear guide arrangement according to claim 39, wherein said lubricant channel discharges into the rolling-element circuit in the region of the curved row of rolling elements.

41. The linear guide arrangement according to claim 1, wherein said guide carriage is provided with a lubricant supply that includes a lubricant supply path extending across said side panel toward said rolling element return guide.

42. The linear guide arrangement according to claim 39, wherein the lubricant channel is formed as an open lubricant groove in an end surface of the reversing body parallel to the axis, said lubricant groove being covered by an adjoining side panel of the guide carriage housing.

43. The linear guide arrangement according to claim 1, wherein said positioning surfaces are effective to position said reversing body with respect to said carriage member along said direction of insertion.

44. The linear guide arrangement according to claim 39, wherein:
  a sealing plate is mounted on the end plate; and
  the lubricant supply hole is located in a region of the end plate not covered by the sealing plate.

45. The linear guide arrangement according to claim 44, wherein:
  the sealing plate is formed with a recess;
  the end plate carries a projection which projects away from the carriage member in axial direction and has an end face which faces away from the carriage member which is accessible through said sealing plate recess; and the lubricant supply hole is formed in said end face of said end plate projection.

46. The linear guide arrangement according to claim 45, wherein the end plate projection is at least partially accommodated by said recess of the sealing plate.

47. The linear guide arrangement according to claim 46, wherein the end plate projection is substantially complementary to said recess of the sealing plate.

48. The linear guide arrangement according to claim 37, wherein said at least one lubricant supply hole is arranged in the region of the side panel and/or a lateral surface of the guide carriage running parallel to the side panel.

49. The linear guide arrangement according to claim 48, wherein said at least one lubricant supply hole is arranged in the border region between an edge of the side panel and an adjoining region of the carriage member.

50. The linear guide arrangement according to claim 48, wherein said at least one lubricant supply hole leads, in a plane substantially orthogonal to the axis, to the returning row of rolling elements.

51. The linear guide arrangement according to claim 49, wherein said at least one lubricant supply hole leads, in a plane substantially orthogonal to the axis, to the returning row of rolling elements.

52. The linear guide arrangement according to claim 37, wherein said at least one lubricant supply hole is provided with a check valve.

53. A linear guide arrangement according to claim 1, further comprising:
  at least one securing crosspiece, extending parallel to the axial direction of the guide rail, for securing said rolling elements of the bearing row of rolling elements against loss even when the guide carriage is removed from the guide rail;
  said securing crosspiece being displaceable between a rolling element securing position and a rolling element insert position.

54. A linear guide arrangement according to claim 1, wherein:
  said contact surface of said reversing body extends below the level of the lower surface of said rolling-element return guide; and
  said curved guide trough is provided in said contact surface such that the lower portion of said radially outer guide surface defined by said face is flush with said lower surface of said rolling-element return guide.

55. A linear guide arrange arrangement according to claim 54, wherein:
  said carriage housing includes a rolling-element reversing member at each end of said rolling-element return guide, each said reversing member being positioned opposite one of said curved guide troughs and having a curved face defining the radially inner guide surface of said curved rolling-element guide; and
  said contact surface of said reversing body is formed with curved recesses for receipt of the curved face of said opposed reversing member, wherein opposed ones of said reversing member and curved guide trough define one of said curved rolling-element guides.

56. A linear guide arrangement according to claim 1, further comprising:
  a positioning well being confined by said guide carriage housing for accommodating said carriage member and said reversing body, said positioning well having lead-in surfaces defining a direction of insertion for said carriage member and said reversing body; and
  snap means being provided for securing said carriage member and said reversing body in a correct operational position with respect to said guide carriage housing in response to insertion movement along said direction of insertion.

57. A linear guide arrangement according to claim 1, wherein said guide carriage is provided with sealing means for sealing engagement with said guide rail, said sealing means comprising a respective sealing plate snappingly fixed on said at least one end plate on a side thereof remote from said at least one reversing body, said sealing plate comprising a sealing lip engaging said guide rail and at least one sealing strip integrally shaped with said side panel and extending in the axial direction across said at least one end plate towards said sealing plate.

58. A linear guide arrangement according to claim 1, wherein said bearing row of rolling elements is secured on said load bearing raceway of said carriage member by an elongated securing member extending along said load bearing raceway in axial direction and at a distance from said load bearing raceway substantially corresponding to the diameter of said rolling elements, said elongated securing member extending through said at least one end plate and being fastened to said end plate on the side thereof remote from said reversing body.

59. A linear guide arrangement according to claim 1, wherein said guide carriage is provided with lubricant supply means, said lubricant supply means comprising a lubricant supply path extending across said side panel toward said rolling element return guide.

60. A linear guide arrangement according to claim 1, wherein said guide carriage is provided with lubricant supply means, said lubricant supply means comprising a lubricant supply path extending from the side of said end plate remote from said reversing body towards a portion of said reversing body participating in establishing said curved rolling element guides, said lubricant supply path having a lubricant supply hole provided in a projection of said end plate directed away from said reversing body, which projection is located outside the circumference of a sealing plate attached to the side of said end plate remote from said reversing body.

61. A linear guide arrangement, comprising:
  a guide rail having an axis and at least one guide carriage, movable on the guide rail in the direction of the axis, which runs on the guide rail with intermediacy of at least one endless rolling-element circuit;
  said rolling-element circuit including a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage;
  said guide carriage including a guide carriage housing and a carriage member made separately from and accommodated within the guide carriage housing; said guide carriage housing comprising at least one side panel adjacent the rolling-element circuit and substantially parallel to the axial direction, and at lease one end plate adjacent one of the curved rows of rolling elements and substantially orthogonal to the axial direction;
  said bearing row of rolling elements running on the carriage member;
  a reversing body, made separately from the carriage member and the guide carriage housing, inserted axially between the carriage member and the end plate, said reversing body participating in establishing a respective one of said curved rolling-element guides, the reversing body and the carriage member being held together in correct position by the guide carriage housing;
  a positioning well being confined by said guide carriage housing for accommodating said carriage member and said reversing body, said positioning well having lead-in surfaces defining a direction of insertion for said carriage member and said reversing body, and
  snap means being provided for securing said carriage member and said reversing body in a correct operational position with respect to said guide carriage housing in response to insertion movement along said direction of insertion.

62. A linear guide arrangement according to claim 61, wherein said snap means comprises respective snap engagement structures of said reversing body and said guide carriage housing, said carriage member being secured in correct operational position by said reversing bodies when said reversing bodies are secured by said snap engagement structures.

63. A linear guide arrangement according to claim 62, wherein said carriage member is secured in its correct operational position by insertion movement limiting face means of said guide carriage housing for limiting the insertion movement of said carriage member and by projections of said reversing body overlying said carriage member along said direction of insertion.

64. A linear guide arrangement, comprising:
  a guide rail having an axis and at least one guide carriage, movable on the guide rail in the direction of the axis, which runs on the guide rail with intermediacy of at least one endless rolling-element circuit;
  said rolling-element circuit including a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage;
  said guide carriage including a guide carriage housing and a carriage member made separately from and accommodated within the guide carriage housing; said guide carriage housing comprising at least one side panel adjacent the rolling-element circuit and substantially parallel to the axial direction, and at least one end plate adjacent one of the curved rows of rolling elements and substantially orthogonal to the axial direction;
  said bearing row of rolling elements running on the carriage member;
  a reversing body made separately from the carriage member and the guide carriage housing, inserted axially between the carriage member and the end plate, said reversing body participating in establishing a respective one of said curved rolling-element guides, the reversing body and the carriage member being held together in correct position by the guide carriage housing; and
  said bearing row of rolling elements being secured on said load bearing raceway of said carriage member by an elongated securing member extending along said load bearing raceway in axial direction and in a distance from said load bearing raceway substantially corresponding to the diameter of said rolling elements, said elongated securing member extending through said at least one end plate and being fastened to said end plate on the side thereof remote from said reversing body.

65. A linear guide arrangement according to claim 64, wherein said elongated member is provided with a fastening arm, said fastening arm extending substantially parallel to said end plate on the side thereof remote from said reversing body, said fastening arm having a terminal securing arm engaging into a securing arm accommodating recess of said end plate.

66. A linear guide arrangement according to claim 65, wherein said fastening arm is accommodated within an accommodating slot of said end plate.

67. A linear guide arrangement, comprising:
  a guide rail having an axis and at least one guide carriage, movable on the guide rail in the direction of the axis, which runs on the guide rail with intermediacy of at least one endless rolling-element circuit;

said rolling-element circuit including a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage;

said guide carriage including a guide carriage housing and a carriage member made separately from and accommodated within the guide carriage housing; said guide carriage housing comprising at least one side panel adjacent the rolling-element circuit and substantially parallel to the axial direction, and at least one end plate adjacent one of the curved rows of rolling elements and substantially orthogonal to the axial direction;

said bearing row of rolling elements running on the carriage member;

a reversing body made separately from the carriage member and the guide carriage housing, inserted axially between the carriage member and the end plate, said reversing body participating in establishing a respective one of said curved rolling-element guide, the reversing body and the carriage member being held together in correct position by the guide carriage housing; and said guide carriage being provided with lubricant supply means, said lubricant supply means comprising a lubricant supply path extending across said side panel toward said rolling element return guide.

68. A linear guide arrangement according to claim 67, wherein said lubricant supply path comprises a notch in an edge area of said side panel engaging said carriage member.

69. A linear guide arrangement, comprising:

a guide rail having an axis and at least one guide carriage, movable on the guide rail in the direction of the axis, which runs on the guide rail with intermediacy of at least one endless rolling-element circuit;

said rolling-element circuit including a bearing row of rolling elements in simultaneous engagement with a bearing rolling-element raceway of the guide rail and a bearing rolling-element raceway of the guide carriage, a returning row of rolling elements in a rolling-element return guide of the guide carriage and curved rows of rolling elements which connect the bearing row of rolling elements and the returning row of rolling elements together at their ends and run in curved rolling-element guides of the guide carriage;

said guide carriage including a guide carriage housing and a carriage member made separately from and accommodated within the guide carriage housing; said guide carriage housing comprising at least one side panel adjacent the rolling-element circuit and substantially parallel to the axial direction, and at least one end plate adjacent one of the curved rows of rolling elements and substantially orthogonal to the axial direction;

said bearing row of rolling elements running on the carriage member;

a reversing body made separately from the carriage member and the guide carriage housing, inserted axially between the carriage member and the end plate, said reversing body participating in establishing a respective one of said curved rolling-element guide, the reversing body and the carriage member being held together in correct position by the guide carriage housing; and said guide carriage being provided with lubricant supply means, said lubricant supply means comprising a lubricant supply path extending from the side of said end plate remote from said reversing body towards a portion of said reversing body participating in establishing said curved rolling element guides, said lubricant supply path having a lubricant supply hole provided in a projection of said end plate directed away from said reversing body, which projection is located outside the circumference of a sealing plate attached to the side of said end plate remote from said reversing body.

70. A linear guide arrangement according to claim 54, wherein:

said reversing body is inserted axially between said carriage member and said end plate by introducing said reversing body into said carriage housing in a direction transverse to the axial direction; and mutually engageable abutment surfaces are provided on said reversing body and said guide carriage housing for transversely positioning the reversing body relative to the carriage member, upon introduction of said reversing body into said guide carriage housing, such that said lower portion of said radially outer guide surface is flush with said lower surface of said rolling-element return guide.

* * * * *